US009880731B1

United States Patent
Wang et al.

(10) Patent No.: US 9,880,731 B1
(45) Date of Patent: Jan. 30, 2018

(54) FLEXIBLE MODULAR SCREEN APPARATUS FOR MOUNTING TO, AND TRANSPORTING USER PROFILES BETWEEN, PARTICIPATING VEHICLES

(71) Applicant: GM Global Technology Operations LLC, Detroit, MI (US)

(72) Inventors: Peggy Wang, Shanghai (CN); Jianfeng Wang, Jiangsu (CN); Jimmy Qi, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/267,964

(22) Filed: Sep. 16, 2016

(51) Int. Cl.
*G06F 3/0488* (2013.01)
*B60R 16/037* (2006.01)

(52) U.S. Cl.
CPC .......... *G06F 3/0488* (2013.01); *B60R 16/037* (2013.01)

(58) Field of Classification Search
CPC ................. G06F 3/0488; G06F 3/0416; G06F 2203/041; G06F 2203/04102; B60R 16/037; H04L 67/306
See application file for complete search history.

(56) References Cited

U.S. PATENT DOCUMENTS

| | | | |
|---|---|---|---|
| 9,229,623 B1* | 1/2016 | Penilla | G06F 3/04842 |
| 2009/0177470 A1* | 7/2009 | Beach | G10L 15/30 |
| | | | 704/235 |
| 2012/0268665 A1* | 10/2012 | Yetukuri | B60K 35/00 |
| | | | 348/837 |
| 2014/0035869 A1* | 2/2014 | Yun | G06F 3/0414 |
| | | | 345/174 |
| 2015/0203125 A1* | 7/2015 | Penilla | G06F 21/445 |
| | | | 701/1 |
| 2016/0018852 A1 | 1/2016 | Myers et al. | |
| 2016/0283014 A1* | 9/2016 | Rider | G06F 1/163 |

OTHER PUBLICATIONS

"China: Mitsubishi Electric develops Chinese handwriting navi input"; http://telematicsnews.info/2013/11/20/china-mitsubishi-electric-develops-Chinese-hand . . . .
"Touch-screen steering wheel keeps drivers focused on the road"; http://phys.org/news/2011-06-touch-screen-wheel-drivers-focused-road.html; Jun. 6, 2011.
Max Pfeiffer et al.; "A Multi-Touch Enabled Steering Wheel—Exploring the Design Space"; Apr. 10-15, 2010.

* cited by examiner

*Primary Examiner* — Tom Sheng
(74) *Attorney, Agent, or Firm* — Mickki D. Murray; Parks IP Law LLC

(57) ABSTRACT

A modular flexible-screen apparatus allowing a user to transport personal preferences or settings between participating vehicles of transportation. The user can carry the preference-holding screen apparatus to and from the same vehicle, and between other vehicles the user owns, and/or to shared, taxi, or rental vehicles.

20 Claims, 16 Drawing Sheets

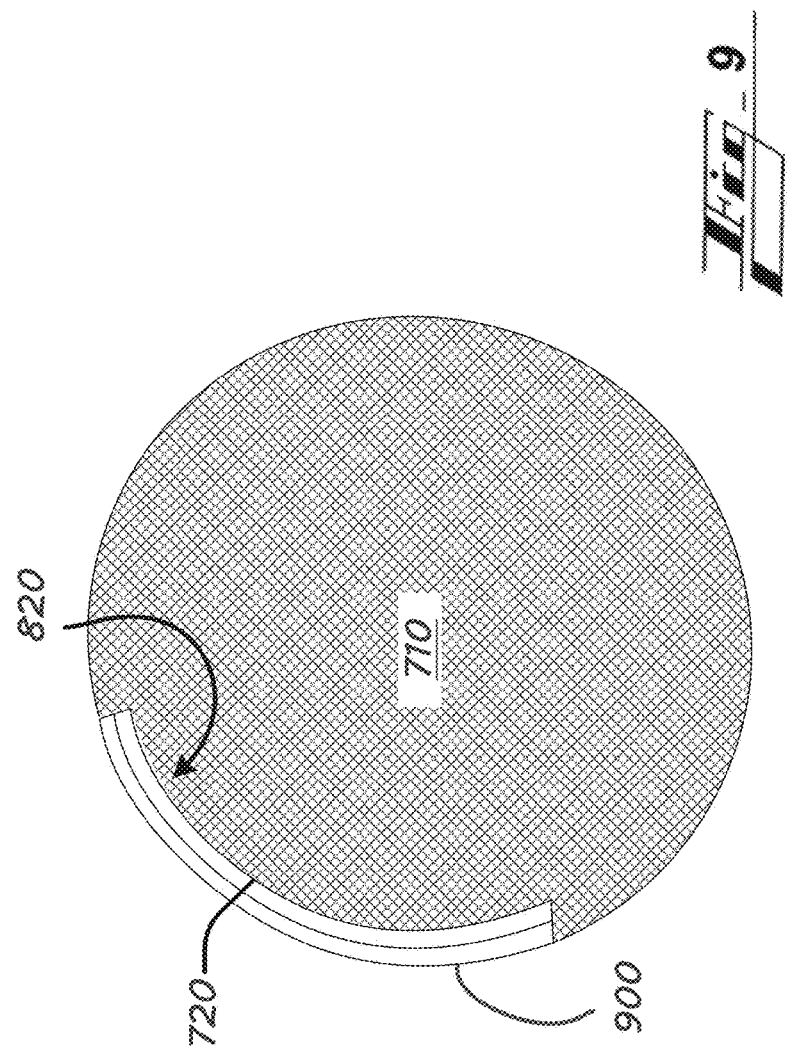

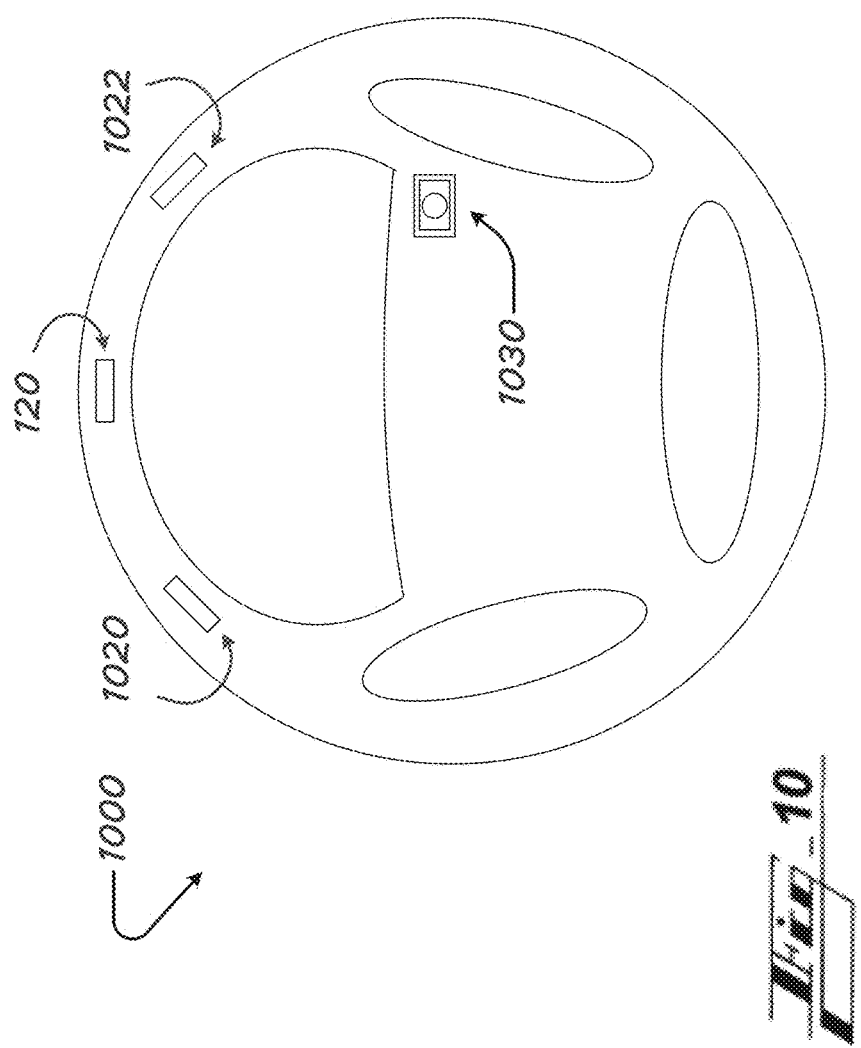

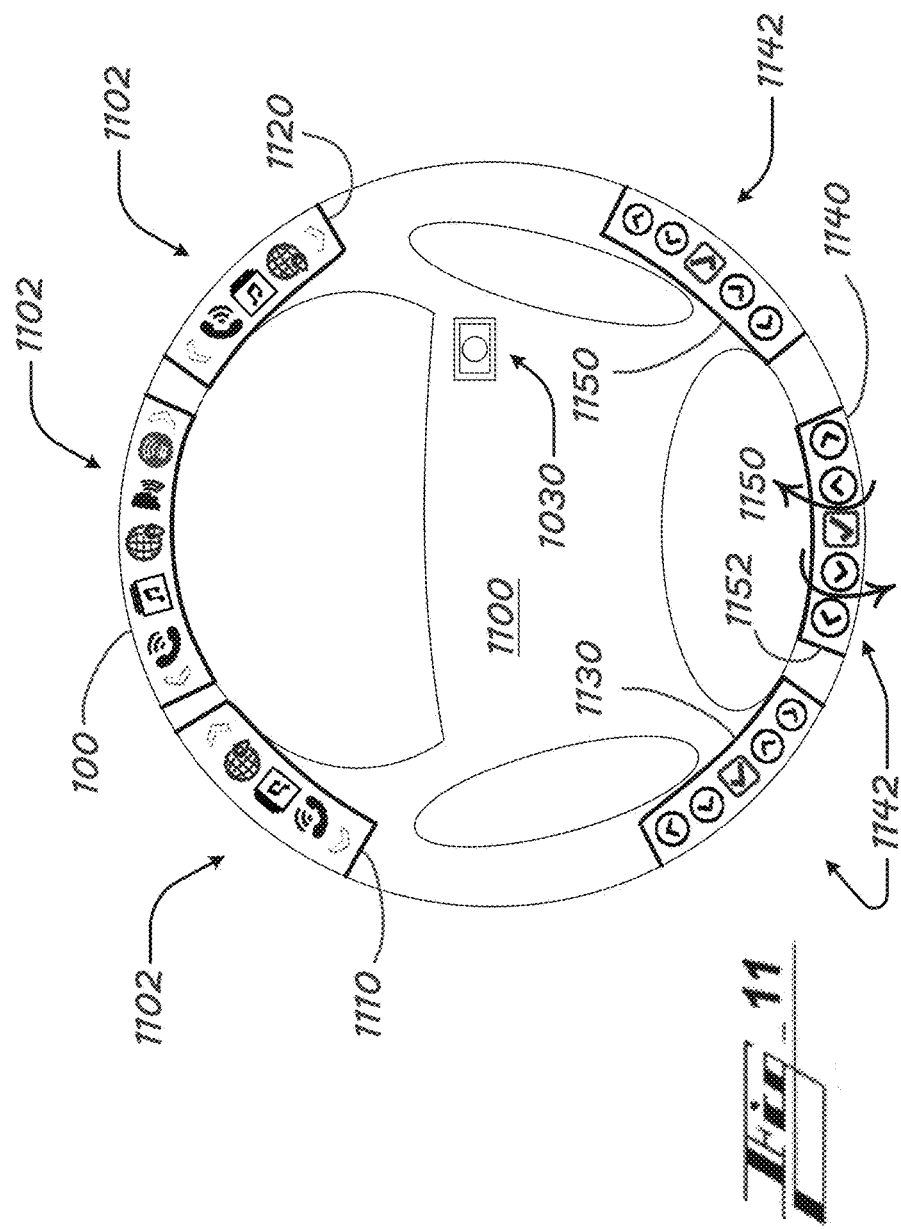

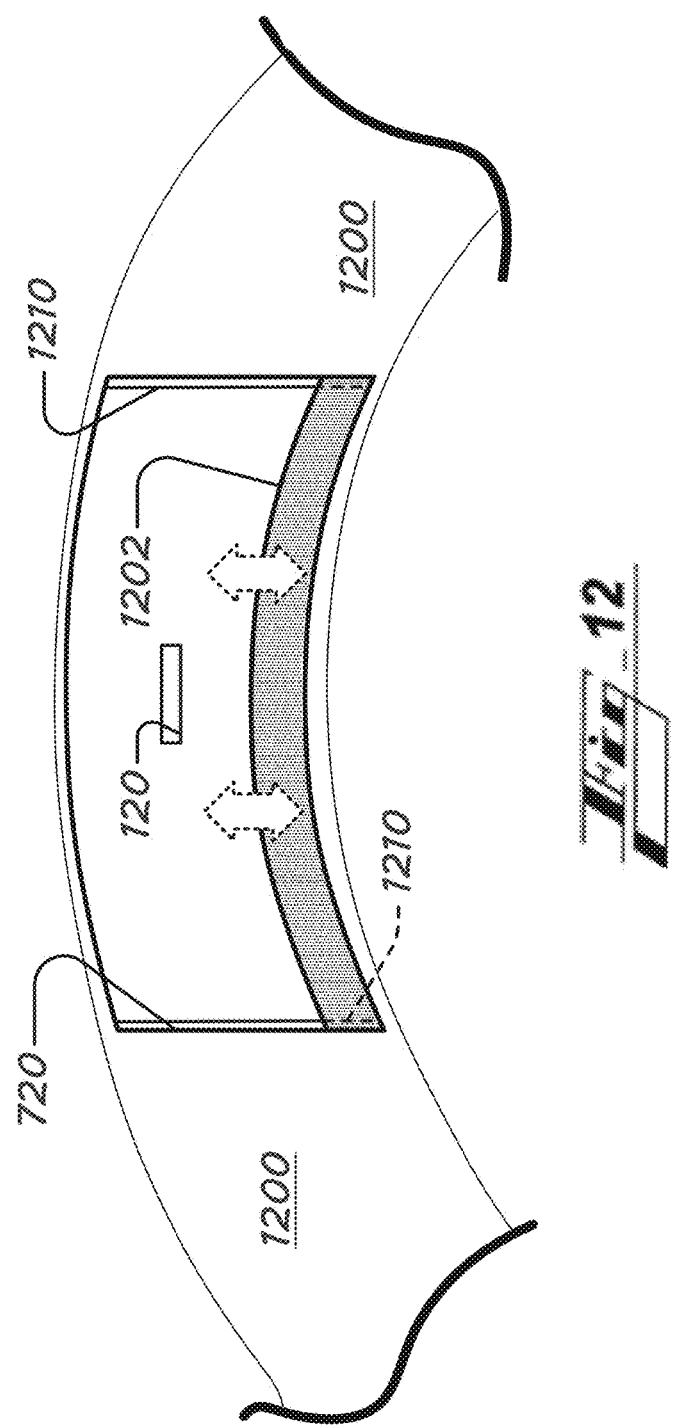

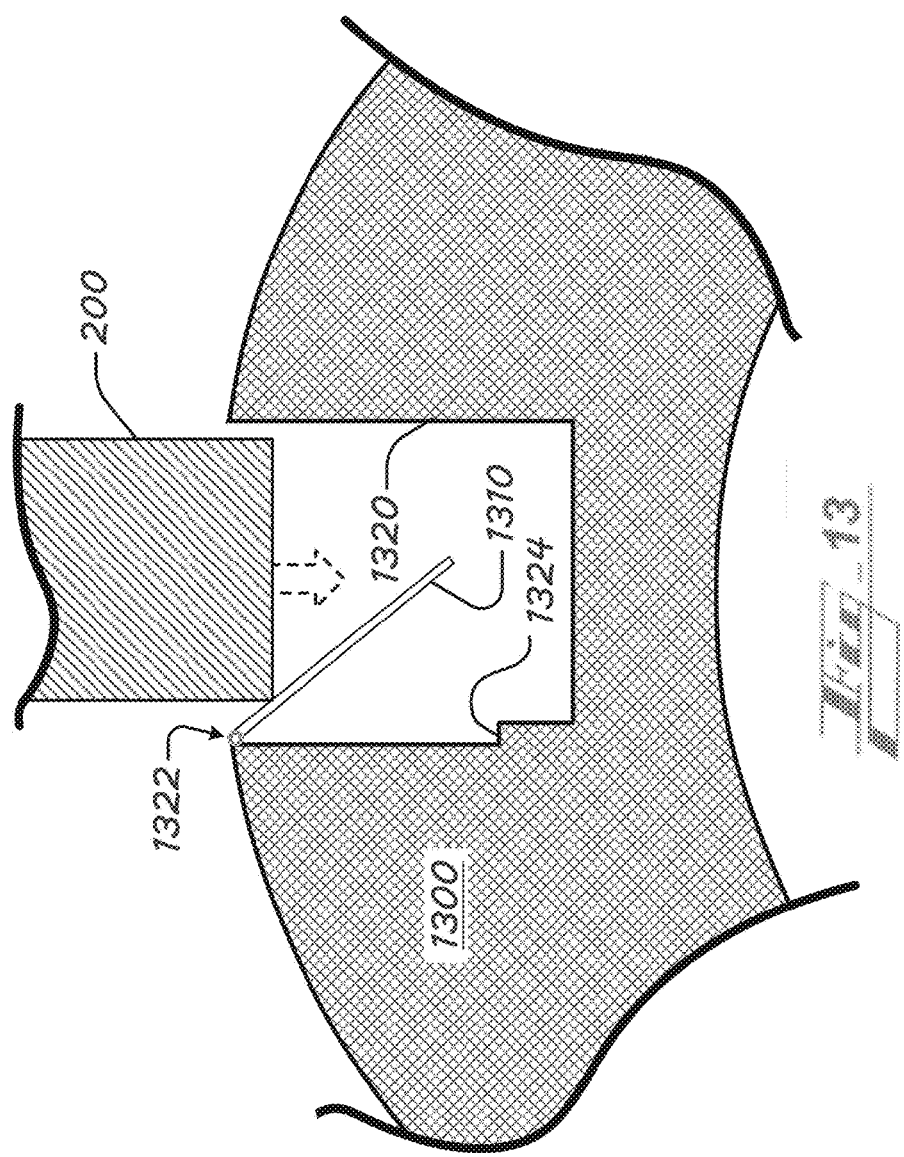

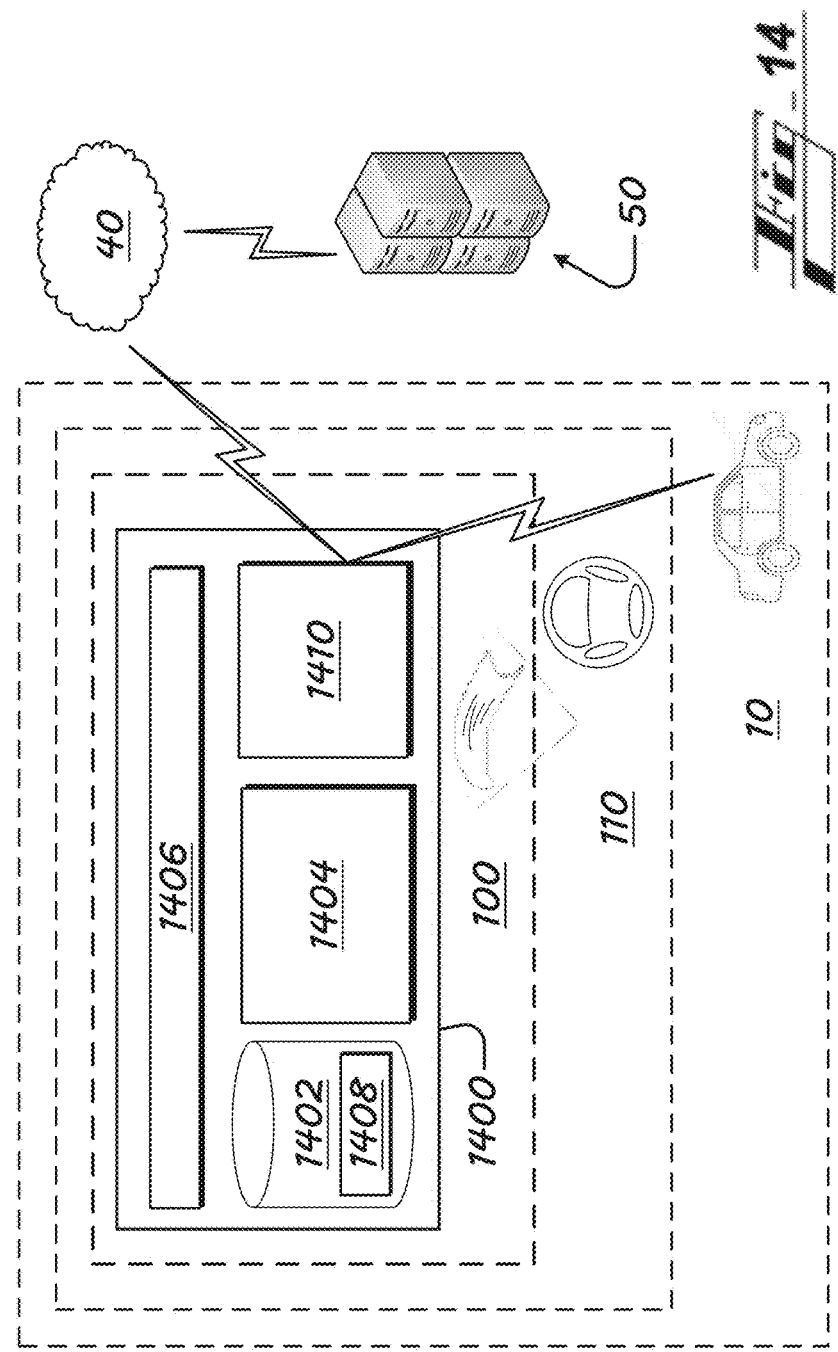

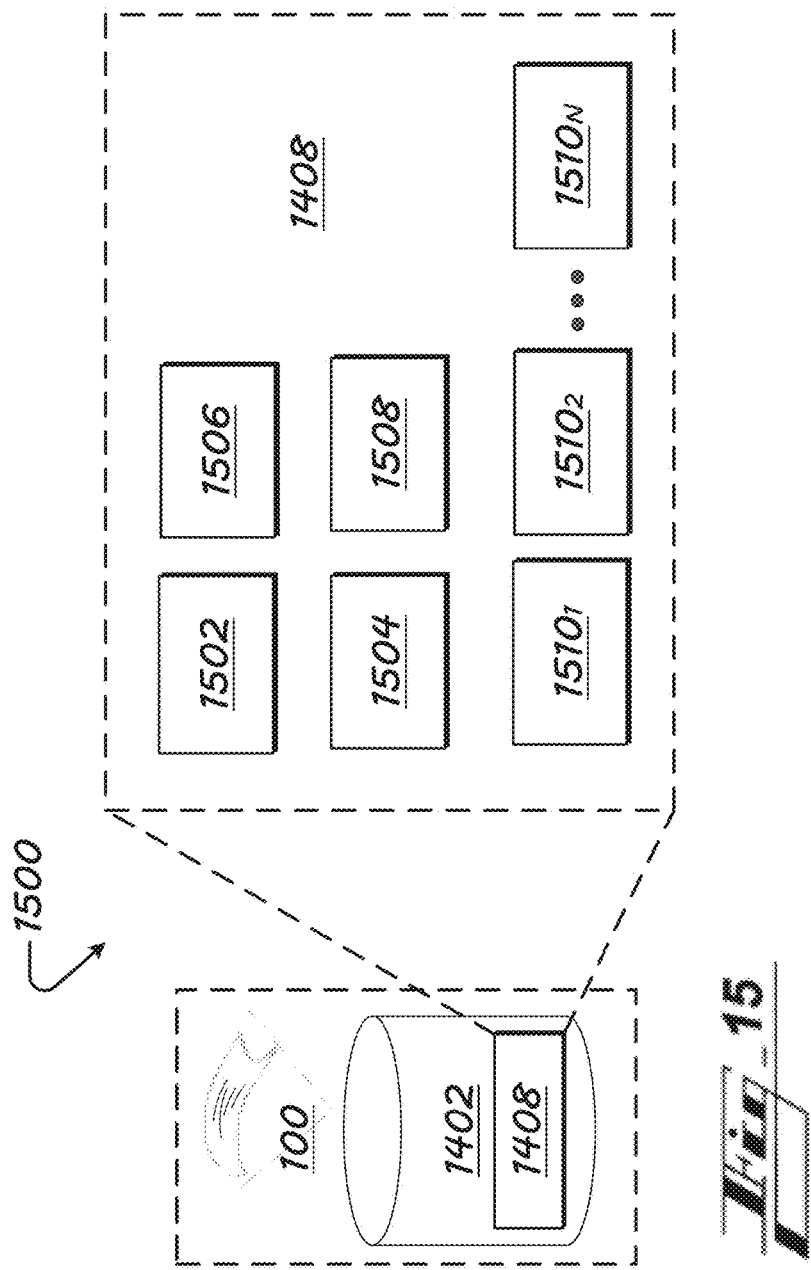

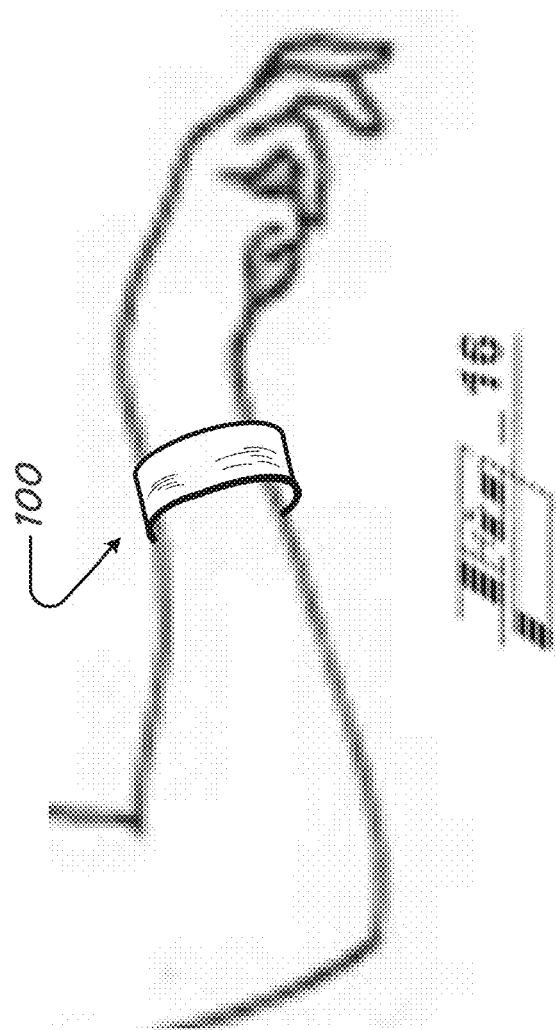

FLEXIBLE MODULAR SCREEN APPARATUS FOR MOUNTING TO, AND TRANSPORTING USER PROFILES BETWEEN, PARTICIPATING VEHICLES

TECHNICAL FIELD

The present disclosure relates generally to apparatus for transporting personal profiles between participating vehicles and, more particularly, to apparatus carrying a user personal profile and having a flexible screen arrangement configured for mounting the apparatus generally seamlessly or inconspicuously and removably to a ring of a steering wheel of participating vehicles, which are in turn configured to receive and work with personal-profile data of the user profile. The personal profiles transported and used at participating vehicles in various embodiments include contents personal contents such as, and not limited to, preferred music, radio stations, audio books, and videos, and vehicle settings such as seats and HVAC settings.

BACKGROUND

This section provides background information related to the present disclosure which is not necessarily prior art.

Most modern vehicles have center console touch-sensitive screens allowing users to control vehicle infotainment functions such as radio channels and navigation. Shortcomings include a requirement that users take their eyes far from the road, and to reach (usually their right hand) their hand to the center of the dashboard to make selections.

Also, when a user changes vehicles, they do not have access to activity or preferences they set in the prior vehicle.

Modern vehicles are also increasingly configured with smartphone projection standard enabling the vehicle radio or head unit to be a display or controller for smartphones programmed with the standard. Shortcomings again include a requirement that users take their eyes far from the road and to reach the center dashboard.

SUMMARY

The present technology solves the above and other shortcomings of prior systems with modular flexible-screen apparatus allowing a user to transport personal preferences or settings between participating vehicles of transportation. The user can carry the preference-holding screen apparatus between vehicles the user owns, and/or to shared, taxi, or rental vehicles, for instance.

The apparatus are configured with flexible screens for mounting removably and generally seamlessly or inconspicuously to steering-wheels rims of various vehicles, and to provide personal profiles to those vehicles being configured to use the personal profiles thereon.

In one aspect, the present technology relates to a modular flexible-screen apparatus, for controlling functions of a host vehicle based on a stored user profile. The apparatus includes a flexible display screen configured to conform to a shape of a driver-area component of the host vehicle.

The apparatus also includes a hardware-based processing unit connected communicatively with the flexible display screen, and a non-transitory computer-readable storage component comprising: a user-profile module comprising the user profile, the user profile including preferences related to functions of the host vehicle.

The storage component also includes a user-interface module that, when executed by the hardware-based processing unit, provides user output to, and receives user input from, a user of the modular flexible-screen apparatus.

The storage component also includes a vehicle-control module that, when executed by the hardware-based processing unit: determines a host-vehicle-control instruction based on the user input and at least one preference of the user profile; and sends the host-vehicle-control instruction to the host vehicle for corresponding implementation at the host vehicle.

In various embodiments, the apparatus is for controlling functions of multiple host vehicles based on the stored user profile, the flexible display screen is configured to conform to shapes of driver-area components of each host vehicle, and the non-transitory computer-readable storage component comprises an apparatus-connection module that, when connected to the driver-area component of any subject host vehicle, established a communication channel with the subject host vehicle for providing the host-vehicle-control instruction to the subject host vehicle.

The driver-area component is selected from a group consisting of, for instance, a steering wheel of the host vehicle; a gear shift of the host vehicle; an instrument-cluster hood or cover of the host vehicle; and a dashboard component of the host vehicle.

In some implementations, the apparatus includes a plug being: connected communicatively with the hardware-based processing unit; and sized, shaped, and positioned at the apparatus to, for use of the apparatus on the host vehicle, connect directly to a matching port of the driver-area component of the host vehicle, without intervening components between the plug and the port.

In various embodiments, the modular flexible-screen apparatus includes a body comprising the flexible screen, wherein the body is sized and shaped to, when bent, fit snugly within an apparatus compartment in the driver-area component of the host vehicle.

In various embodiments, the apparatus includes a mounting material or structure configured and positioned at the apparatus to promote temporary attachment of the apparatus to the driver-area component of the host vehicle.

In various embodiments, the user-interface module, when executed by the hardware-based processing unit, receives an enablement signal from a host-vehicle switch and changes the apparatus between an on mode and an off mode, or between a sleep mode and an awake mode based on the enablement signal.

In various embodiments, the user-interface module, when executed by the hardware-based processing unit, receives a control signal from a host-vehicle apparatus-operation interface and changes visual output of the apparatus based on the control signal.

In various embodiments, the apparatus further includes a body comprising the flexible screen, wherein the body is sized and shaped to attach to a user wrist for transporting the apparatus when the apparatus is not in use on the host vehicle.

Various aspects of the present technology include a non-transitory computer-readable storage devices and algorithms configured to perform any of the operations described, and processes including the operations performed by these systems, storage devices, and algorithms.

Other aspects of the present technology will be in part apparent and in part pointed out hereinafter.

DESCRIPTION OF THE DRAWINGS

FIG. 9 shows a side cross section of a sixth embodiment of a modular flexible-screen apparatus mounted on a rim of a vehicle steering wheel.

FIG. 10 shows an example steering wheel configured according to an embodiment of the present technology, before any modular flexible-screen apparatus is mounted thereon.

FIG. 11 shows a steering wheel having modular flexible-screen apparatus mounted at three optional positions atop the steering wheel rim, and example control screens at three optional positions at a lower portion of the steering wheel.

FIG. 12 shows a steering wheel having a curved, retractable door for covering a steering-wheel-ring cavity, when the cavity is not holding a modular flexible-screen apparatus.

FIG. 13 shows a steering wheel having a retractable door for covering a (universal-serial-bus) USB or similar port when not engaged with the modular flexible-screen apparatus.

FIG. 14 illustrates schematically components of an example modular flexible-screen apparatus for mounting on a steering-wheel rim of a vehicle.

FIG. 15 emphasizes example code components or modules of the modular flexible-screen apparatus.

FIG. 16 shows an example embodiments in which the modular flexible-screen apparatus on her wrist, for transporting between uses of the apparatus on a vehicle removed from or another vehicle.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, modular apparatus allowing a user to transport personal preferences or settings between vehicles of transportation. The apparatus are configured with flexible screens for mounting removably and generally seamlessly or inconspicuously to steering-wheels rims of various vehicles, and to provide personal profiles to those vehicles being configured to use the personal profiles thereon.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, manufacturing equipment (for example, forklift), construction machines, and agricultural machinery, or of warehouse equipment, devices at the office, home appliances, the like, and other.

While select examples of the present technology describe autonomous vehicles, the technology is not limited to use in autonomous vehicles (fully or partially autonomous), or to times in which an autonomous-capable vehicle is being driven autonomously. References herein to characteristics of a passenger, and communications provided for receipt by a passenger, for instance, should be considered to disclose analogous implementations regarding a vehicle driver during manual vehicle operation. During fully autonomous driving, the 'driver' is considered a passenger.

II. Host Vehicle—FIG. 1

Figure 1:
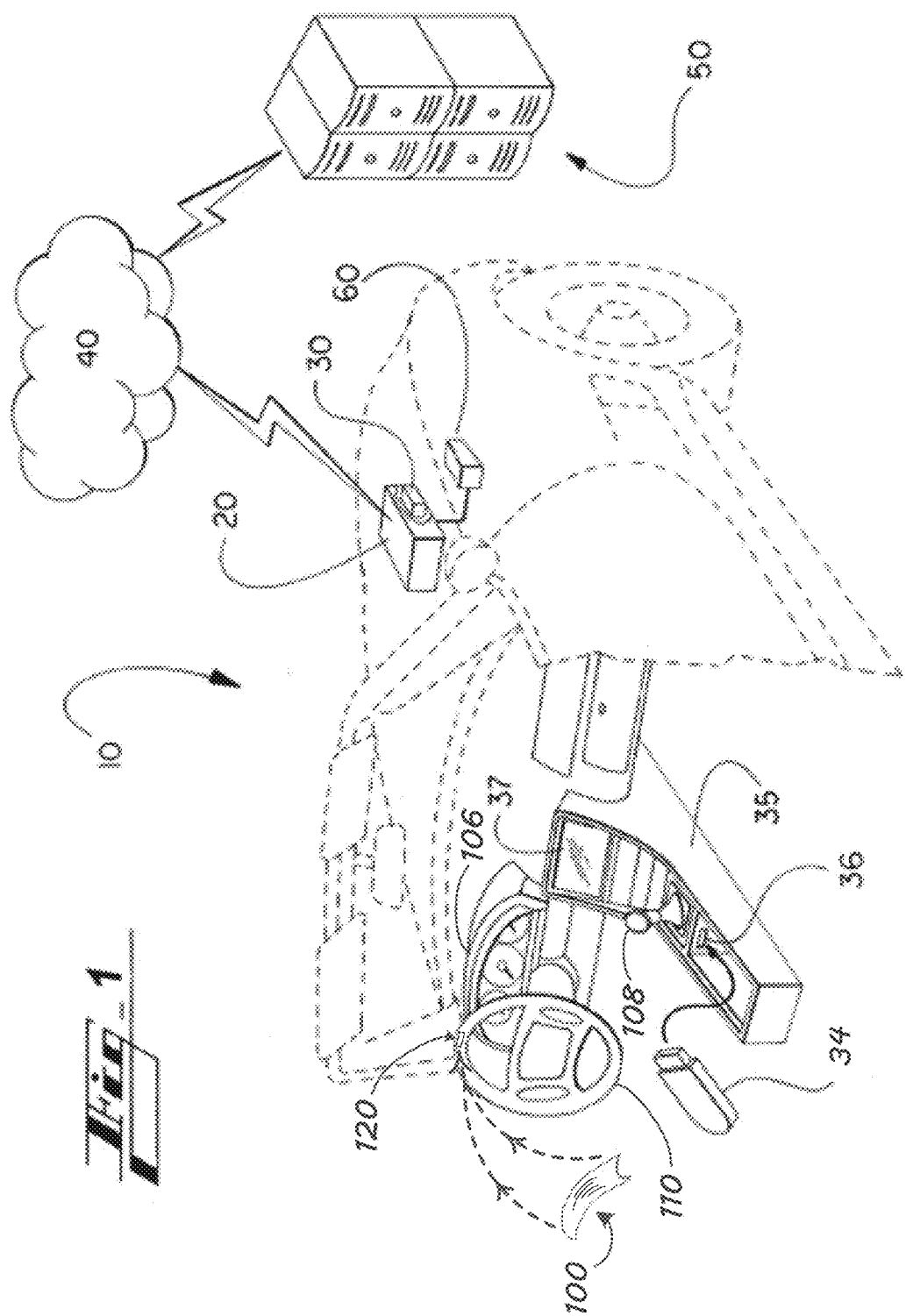
FIG. 1 illustrates schematically an example vehicle of transportation, with a modular flexible-screen apparatus and remote computing devices, according to embodiments of the present technology.

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34, 100 and external networks 40.

By the external networks 40, such as the Internet, a local-area, cellular, or satellite network, vehicle-to-vehicle, pedestrian-to-vehicle, road-side infrastructure networks, the like or other, the vehicle 10 can reach mobile or local systems 34, 100 or remote systems 50, such as remote servers.

The primary mobile device is a subject modular flexible-screen apparatus 100. The modular flexible-screen apparatus 100 is configured for being mounted on a steering wheel rim of any participating vehicle 10. The modular flexible-screen apparatus 100 is in some embodiments also configured to be worn by a user between uses on the vehicle steering-wheel, as a wearable—e.g., FIG. 16.

Other example mobile or local devices 34 include smartphones, other wearable devices, USB mass-storage device (as shown), or other plug-in I/O devices.

Still another example mobile or local device is an on-board device (OBD) (not shown in detail), such as a wheel sensor, a brake sensor, an accelerometer, a rotor-wear sensor, a throttle-position sensor, a steering-angle sensor, a revolutions-per-minute (RPM) indicator, a brake-torque sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN) and/or Ethernet. The CAN/Ethernet message-based protocol is typically designed for multiplex electrical wiring with automobiles, and CAN/ETHERNET infrastructure may include a CAN/ETHERNET bus. The OBD can also be referred to as vehicle CAN/ETHERNET interface (VCI, VEI, etc.) components or products, and the signals transferred by the CAN/ETHERNET may be referred to as CAN/ETHERNET signals. Communications between the OBD(s) and the primary controller or microcontroller 20 are in other embodiments executed via similar or other message-based protocol.

The vehicle 10 also has various mounting structures 35. The mounting structures 35 include a steering wheel 110, a central console, and a hood or other part of a dashboard or instrument panel 106, and a gear shift 108.

The mounting structures 35 include at least one plug-in port—a USB port, for instance—and a built-in visual display 37, such as a touch-sensitive, input/output, human-machine interface (HMI). A first example plug-in-port is shown in a center console and labeled with numeral 36.

Another example plug-in port 120 is at the steering wheel 110. While the port 120 is shown top, center, one or more such ports can be located at any portion of the steering wheel rim, such as the positions shown in FIG. 10, or any other part of the steering wheel.

The vehicle 10 also has a sensor sub-system 60 including sensors providing information to the controller 20. Sensor input to the controller 20 is shown schematically at the right, under the vehicle hood, of FIG. 1.

Sensor data relates to features such as vehicle operations, vehicle dynamics, environment, driver or passenger physiology (biometrics), the like and other from camera's microphones, temperature sensors, etc.

The OBDs mentioned can be considered as local devices, sensors of the sub-system 60, or both in various embodiments.

Local devices 34, 100 can be used as sensors 60 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

The vehicle 10 also includes cabin output components such as audio speakers and an instruments panel or display. The output components may also include a dash or center-stack display screen, a rear-view-mirror screen (for displaying imaging from a vehicle aft/backup camera), and any vehicle visual display device 37.

III. Example Modular Flexible-Screen Apparatus—FIG. 2

Figure 2:
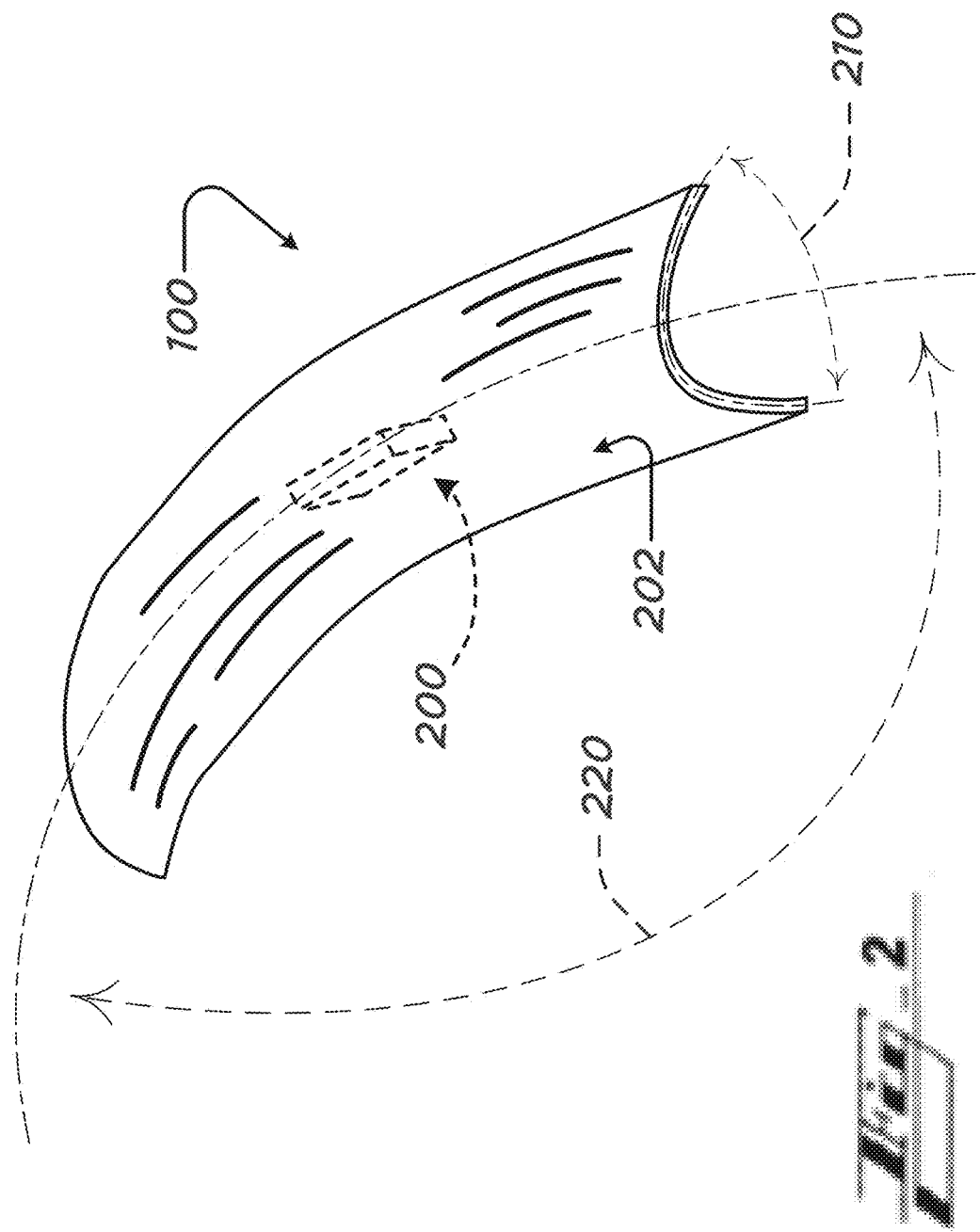
FIG. 2 illustrates schematically more details of the modular flexible-screen apparatus according to a first embodiment.

FIG. 2 illustrates schematically more detail of the modular flexible-screen apparatus 100 according to a first embodiment.

The apparatus includes a screen 202 that can extend fully or partially between each opposing edge of the apparatus 100. The apparatus 100 can include a body, which in contemplated embodiments includes the screen 202, mostly or entirely.

The screen 202 is flexible, such as by including an organic light emitting diode (OLED), or flexible OLED (FOLED).

The modular flexible-screen apparatus 100 in some embodiments includes a plug 200, such as a USB plug. In contemplated embodiments, the plug, whether a USB plug or just a securing structure, functions to perform all or at least some of the securing holding the modular flexible-screen apparatus 100 to the steering wheel 110. The plug 200 and port 120 may be configured (e.g., sized and shaped) so the plug friction fits, or snugly fits, within the port 120.

The apparatus 100 and steering wheel 110 are configured in some embodiments so that the apparatus 100, via the plug 200, connects by wire directly to the steering wheel 110, via the port—i.e., without any intervening, connecting wires, adaptors, or the like.

The modular flexible-screen apparatus 100 can have any of a wide variety of shapes and sizes without departing from the present technology. While a rectangle apparatus 100 is shown in the figures by way of example, the apparatus 100 can have other shapes, such as oval, square, round, etc.

The modular flexible-screen apparatus 100 is in various embodiments sized and shaped to fit on a rim of a steering wheel, as shown for three (3) example apparatus in FIG. 11, for instance, or even on an entirety of the rim (not shown in detail). The apparatus 100 in various embodiments is configured so that when installed on the steering wheel is generally seamless or has a low profile with respect to the steering wheel. The modular flexible-screen apparatus 100 does not protrude much from the steering wheel, for instance, or does not protrude very much, so as to substantially match the shape of the steering wheel.

The modular flexible-screen apparatus 100 is in various embodiments bendable in any of multiple directions. The modular flexible-screen apparatus 100 may be bent or folded along its length, for instance. The bending in this direction forms a longitudinal bend angle 210 between about 178 degrees and about 90 degrees or less, for instance.

The modular flexible-screen apparatus 100 may be bent or folded along its width. The bending in this direction forms a lateral bend angle 220 between about 178 degrees and about 90 degrees or less, for instance.

IV. Example Assemblage—FIG. 3

Figure 3:
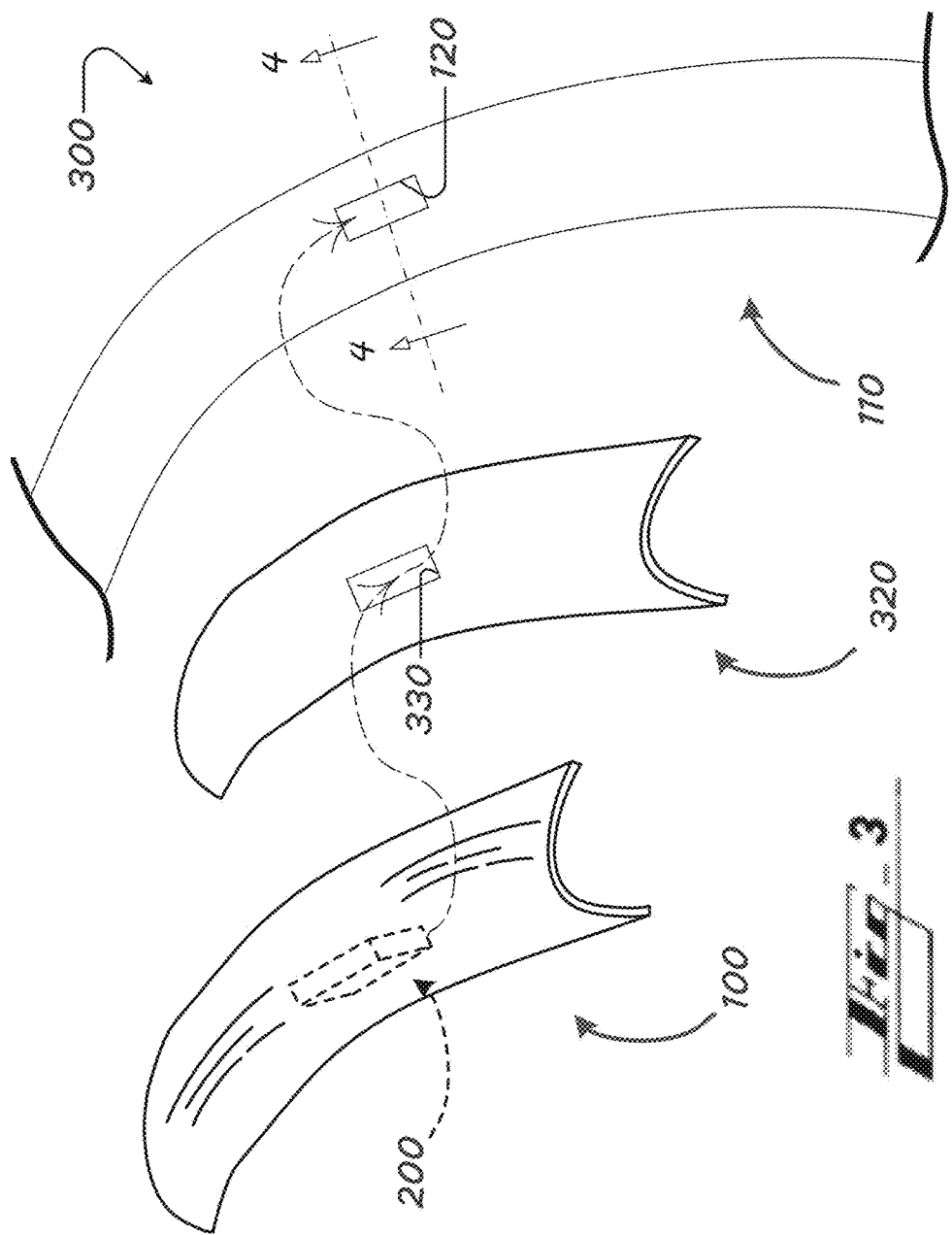
FIG. 3 shows the modular flexible-screen apparatus being mounted on a rim of a vehicle steering wheel.

FIG. 3 shows an arrangement 300 including the modular flexible-screen apparatus 100, a vehicle steering wheel 110, and a mounting apparatus 320. The view shows the modular flexible-screen apparatus 100 being mounted on a ring or rim of the vehicle steering wheel 110.

The modular flexible-screen apparatus 100 is configured with any suitable structure for performing the operations referenced herein. Computing structure of the modular flexible-screen apparatus 100 is described further below, with respect to FIGS. 14 and 15.

The modular flexible-screen apparatus 100, and participating vehicle 10, are configured (e.g., sized, shape, material) in any of a wide variety of ways for the modular flexible-screen apparatus 100 to mount readily and removably to participating vehicles. While the vehicle steering wheel 110, and particularly, the rim or ring thereof, is shown as the primary mounting location in the vehicle 10, the modular flexible-screen apparatus 100 and participating vehicles 10 can be configured in any of a variety of ways so that the modular flexible-screen apparatus 100 can be mounted to other surfaces.

As an example, another mounting surface for the modular flexible-screen apparatus 100 can be a hood 106 over an instrument panel, as shown in FIG. 1 (shown without the apparatus 100 being mounted thereon). Another example mounting surface for the modular flexible-screen apparatus 100 is a gear shift 108, also shown in FIG. 1 (shown without the apparatus 100 being mounted thereon). And another example mounting surface is any component or part of a dashboard of the vehicle 10.

Because in various embodiments the apparatus 100 would be easily reachable by the driver, the possible locations for mounting the apparatus 100 can be said to be in a driver area. The components on which the apparatus 100 would be mounted, such as the steering wheel, gear shift, instrument-panel hood, and dashboard part, can be referred to as driver-area components.

In various embodiments, the modular flexible-screen apparatus 100 is configured to be mounted directly to the vehicle-mounting location—e.g., steering wheel rim—or to be mounted to the vehicle-mounting location by way of one or more intermediary or mounting structures or materials.

FIG. 3 shows an example intermediary structure 320. For embodiments in which the modular flexible-screen apparatus 100 includes a plug 200, such as the plug 220 shown in FIGS. 2 and 3, the intermediary structure 320 can include an opening 330 for receiving the plug 200, as shown in FIG. 3. The opening 330 is configured and arranged in the intermediary structure 320 to be aligned with the steering-wheel port 120 when the system is assembled and installed on the wheel 110.

Figure 7:
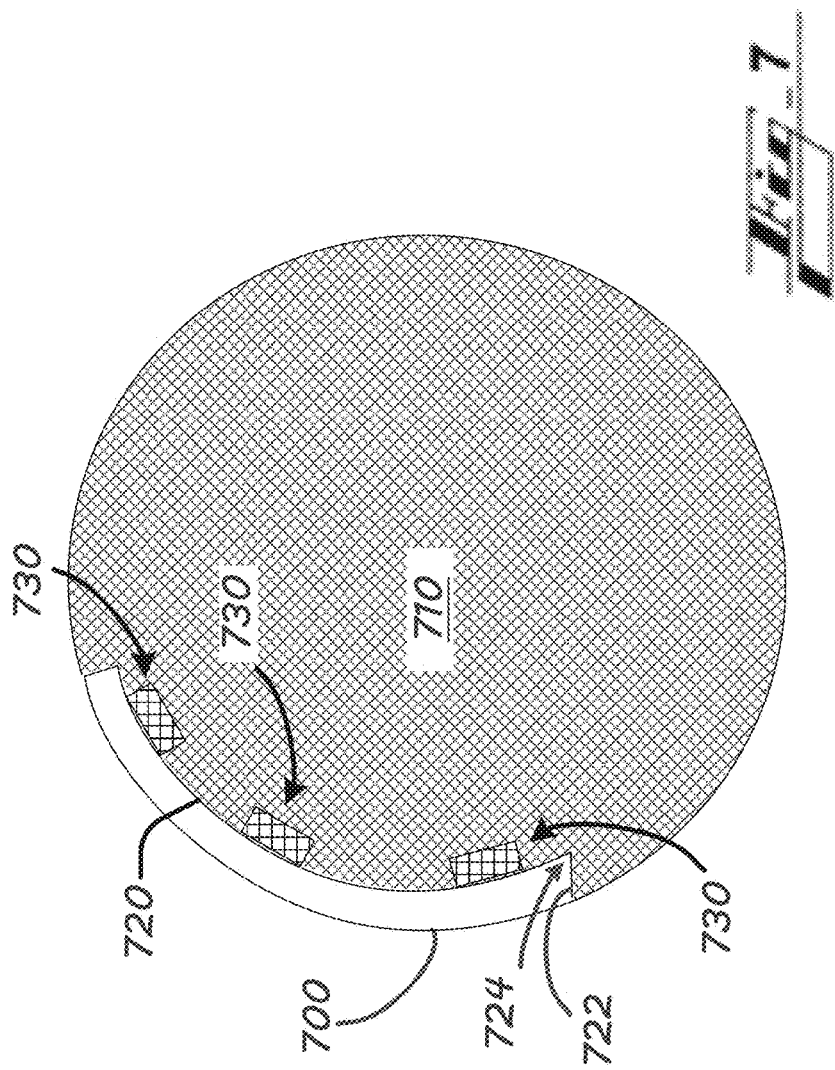
FIG. 7 shows a side cross section of a fourth embodiment of a modular flexible-screen apparatus mounted on a rim of a vehicle steering wheel.
Figure 8:
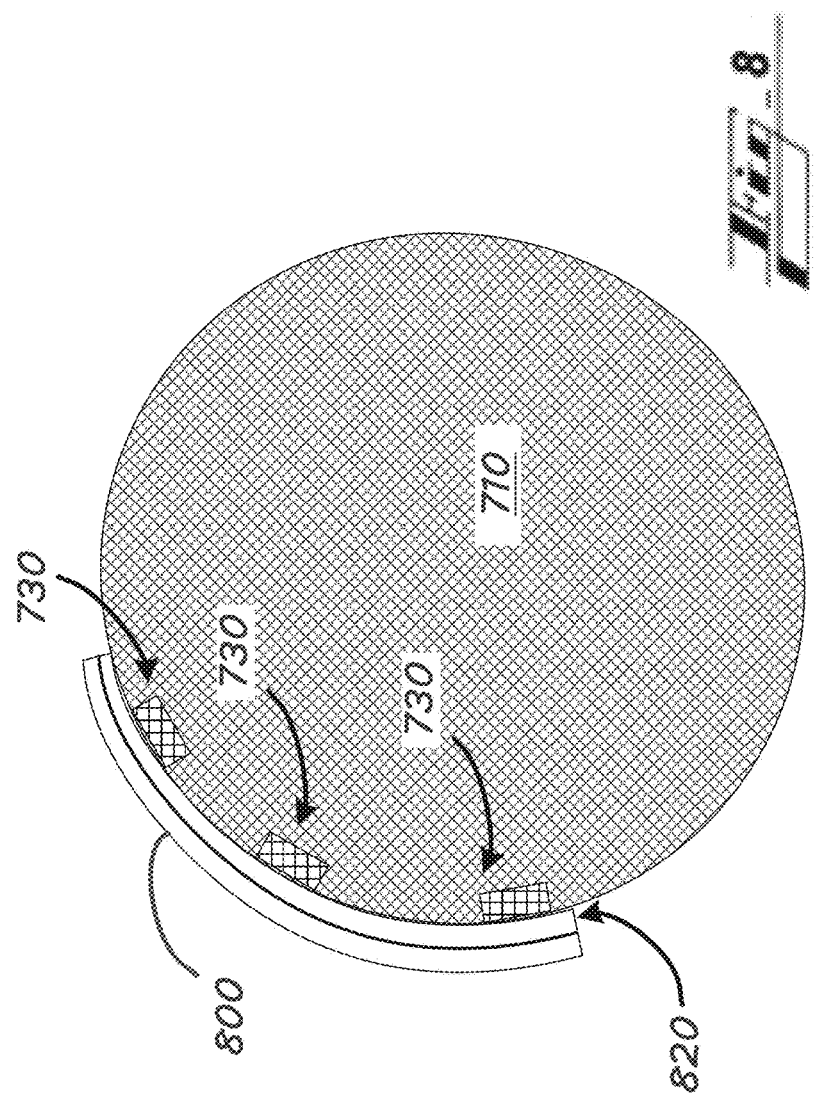
FIG. 8 shows a side cross section of a fifth embodiment of a modular flexible-screen apparatus mounted on a rim of a vehicle steering wheel.

The intermediary or mounting structure 320 is configured to facilitate the apparatus-to-steering-wheel mounting. The intermediary structure 320 in one embodiment includes a magnet or metal configured (e.g., size and shape) and arranged (e.g., location) to mate with a magnet or metal in the steering wheel 110. FIGS. 7 and 8 show example intra-steering rim magnets or other structure facilitating mounting of the modular flexible-screen apparatus 100 on the steering wheel 110.

The intermediary structure 320 in various embodiments is also configured and arranged to engage the modular flexible-screen apparatus 100. The intermediary structure 320 can include, for instance, a magnet or metal configured and arranged to engage metal or magnet of the modular flexible-screen apparatus 100.

In contemplated embodiments, the modular flexible-screen apparatus 100, the intermediary structure 320, and or the vehicle mounting surface—e.g., steering wheel rim surface—includes or is partially or fully covered with a mounting material, such as an adhesive, tacky, or sticky material. For readily removing and reattaching the modular flexible-screen apparatus 100 to the same or another vehicle 10, the mounting material is configured to maintain its function, such as being sticky.

V. Side View of Assembly—FIG. 4

Figure 4:
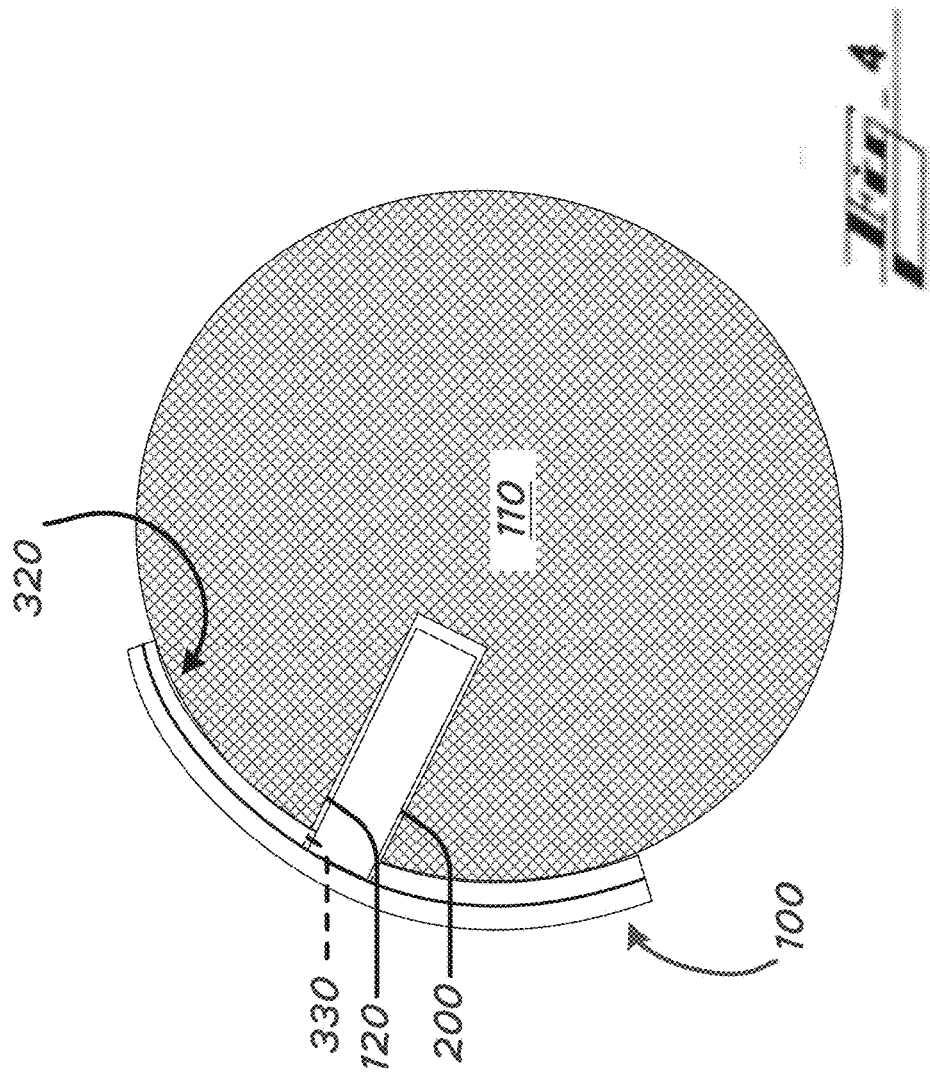
FIG. 4 shows a side cross section, taken along lines 4-4 of FIG. 3, of the first embodiment of the modular flexible-screen apparatus mounted on a rim of a vehicle steering wheel.

FIG. 4 shows a side cross section, taken along lines 4-4 of FIG. 3, of the first embodiment of the modular flexible-screen apparatus 100 mounted on the rim of the vehicle steering wheel 110 with the intermediary structure 320 promoting the connection.

Also, as referenced, the plug 320 can also provide some or all of the needed connection between the modular flex-ible-screen apparatus 100 and the steering wheel 110.

As shown, the modular flexible-screen apparatus 100 can be shaped to conform to an exterior shape of the rim of the steering wheel 110, such as by being, or being able to be, curved to match the shape of the steering wheel rim.

In a contemplated embodiment, the modular flexible-screen apparatus 100 is configured so that a user can change the shape of the modular flexible-screen apparatus 100 from flat, or slight bend, to a bend or larger bend matching the steering wheel rim shape, such as by pressing edges of the modular flexible-screen apparatus 100 against the wheel.

In a contemplated embodiments, the modular flexible-screen apparatus 100 has some shape memory. The modular flexible-screen apparatus 100 is configured in these cases so that after a user changes the shape of the apparatus 110 from a first shape (e.g., flat or generally flat) to a second shape (e.g., bent to conform to the ring of the steering wheel 110), such as to mount it on the steering wheel, using magnets to hold the new shape, and then removes the apparatus 110, the apparatus returns automatically to the first shape. In another contemplated implementation with the apparatus 100 having shape memory, the default shape is bent, such as at a shape matching the shape of the steering wheel rim, and can be straightened by the user, such as to transport the apparatus 110 in a pocket or case.

The steering wheel 110 in some embodiments includes a movable cover that, when the apparatus 600 is not mounted on the steering wheel 110, automatically or manually moves the port 120, to cover the port 120. An example port-covering door is shown in FIG. 13.

VI. Beveled-Edge Embodiment—FIG. 5

Figure 5:
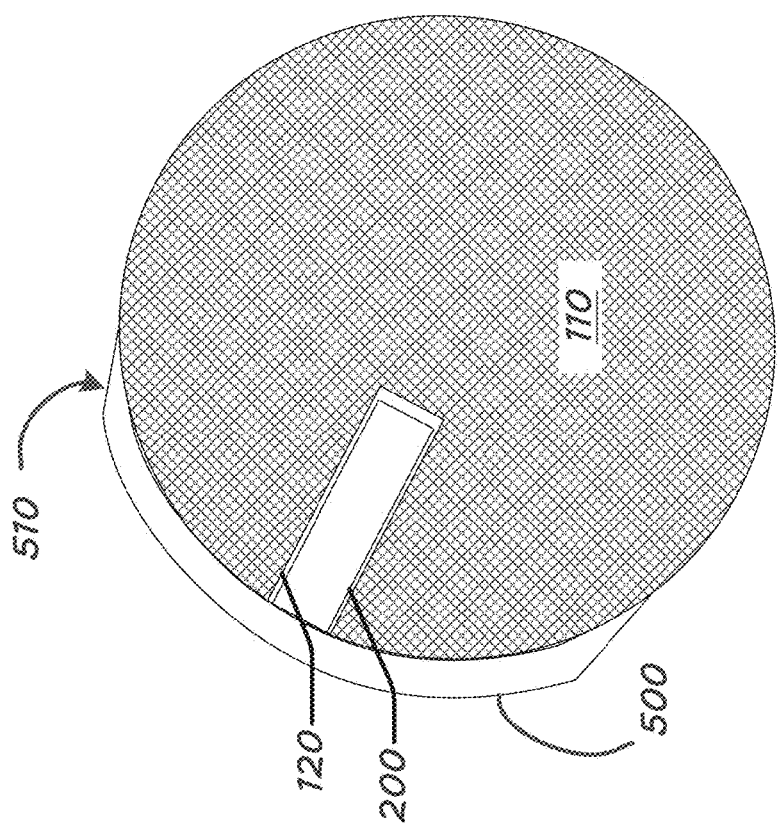
FIG. 5 shows a side cross section of a second embodiment of a modular flexible-screen apparatus mounted on a rim or ring of a vehicle steering wheel.

FIG. 5 shows a side cross section of a second embodiment of a modular flexible-screen apparatus 500 mounted on a ring of a vehicle steering wheel 110.

As mentioned, the apparatus 100 in various embodiments is configured so that when installed on the steering wheel is generally seamless or has a low profile with respect to the steering wheel. And the modular flexible-screen apparatus 100 does not protrude much from the steering wheel, for instance, or does not protrude very much, so as to substantially match the shape of the steering wheel.

FIG. 5 shows an example in which edges 510 of the apparatus 500 are beveled, tapered, or otherwise configured to ease or limit a transition between a face of the apparatus 100 and the steering wheel 110.

By the embodiment of FIG. 5, the modular flexible-screen apparatus 500 is not connected to a separate intermediary or connecting structure, like the structure 320 of FIGS. 3 and 4. Connection structure or material—such as magnet, metal, buckle, tacky or adhesive surface, etc.—is in various embodiment incorporated into the body of the modular flexible-screen apparatus 500.

Further regarding connection between the apparatus 500 and the steering wheel 110 the port 120 and the apparatus 500 including the plug 200 can, as with the embodiment of FIG. 2, be configured (e.g., sized and shaped) so the plug 200 fits snugly inside the port 120, promoting securement of the apparatus 500 against the steering wheel 110.

VII. Embedded Apparatus with Plug-In—FIG. 6

Figure 6:
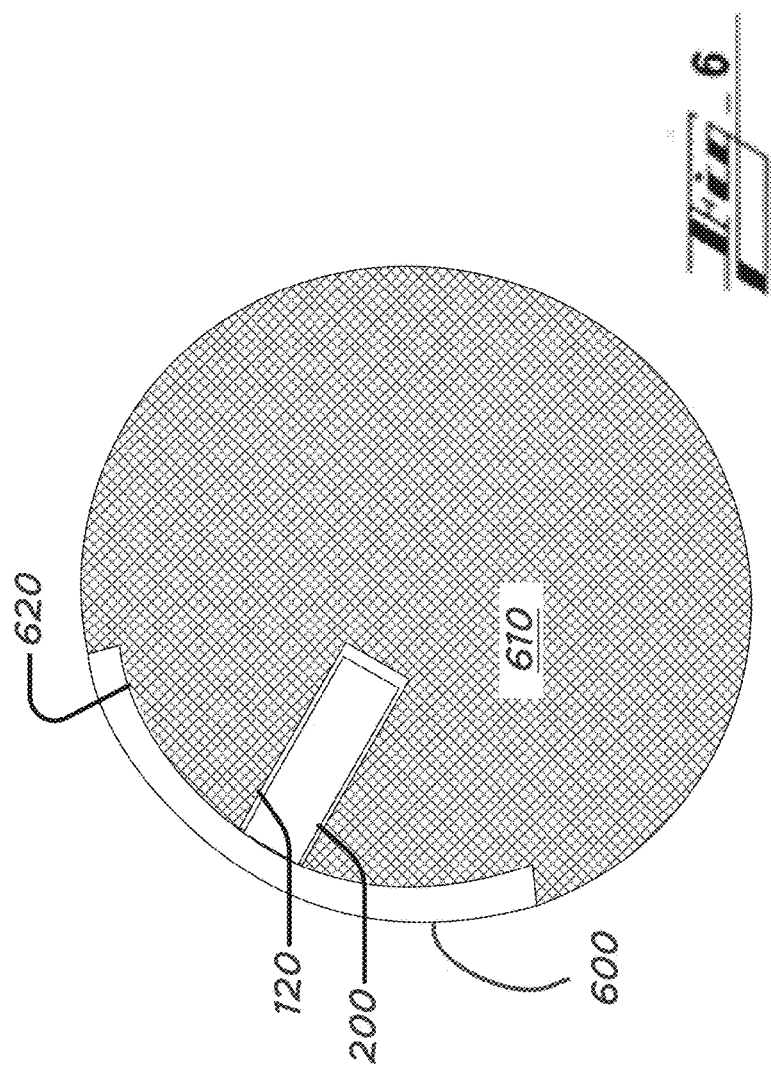
FIG. 6 shows a side cross section of a third embodiment of a modular flexible-screen apparatus mounted on a rim of a vehicle steering wheel.

FIG. 6 shows a side cross section of a third embodiment of a modular flexible-screen apparatus 600 mounted on a ring of a vehicle steering wheel 610.

The steering wheel 610 includes a compartment, recess, or cavity 620 configured to receive the modular flexible-screen apparatus 100.

The steering wheel 610 in some embodiments includes a movable cover that, when the apparatus 600 is not mounted on the steering wheel 610, automatically or manually moves to cover the cavity 620. An example cavity-covering door is shown in FIG. 12.

By the embodiment of FIG. 6 also, the modular flexible-screen apparatus 600 is not connected to a separate intermediary or connecting structure, like the structure 320 of FIGS. 3 and 4. Connection structure or material—such as magnet, metal, buckle, tacky or adhesive surface, etc.—is in various embodiment incorporated into the body of the modular flexible-screen apparatus 600.

Further regarding connection between the apparatus 600 and the steering wheel 610, (i) the port 120 and the apparatus 600 including the plug 200 can, as mentioned, be configured (e.g., sized and shaped) so the plug 200 fits snugly inside the port 120, promoting securement of the apparatus 600 against the steering wheel 610, and (ii) the cavity 620 and the apparatus 600 are in various embodiments configured (e.g., sized and shaped) so the apparatus 600 fits snugly inside the cavity 620, promoting securement of the apparatus 610 in the cavity 620.

VIII. Embedded Wireless Apparatus with Mounting Structure—FIG. 7

FIG. 7 shows a side cross section of a fourth embodiment of a modular flexible-screen apparatus 700 mounted on a ring of a vehicle steering wheel 710.

In this embodiment, too, the steering wheel 710 includes a cavity or cavity 720. In a contemplated implementation, the cavity 720 include a shelf 722 angled to promote receiving and holding of the apparatus 700 in the cavity 720. The apparatus 700 is in various embodiments configured to fit fittingly against the shelf or in the corner 724 formed with the shelf and back wall of the cavity 720, to promote securement of the apparatus 700 to the steering wheel 710.

By the embodiment, the steering wheel 710 also includes mentioned example mounting structure 730. The mounting structure 730 can include, for instance, magnets to mate with metal or magnets (not called out) of the modular flexible-screen apparatus 700. Other example mounting structure 730 include adhesive or tacky materials, part of a hook-and-loop system to mate with another part (not shown in detail) on the modular flexible-screen apparatus 700.

The embodiment of FIG. 7 also does not include a plug/port system, as in those of FIGS. 2-6. As described further below regarding FIG. 15, the modular flexible-screen apparatus 700 and any modular flexible-screen apparatus herein can be configured for wireless communications with at least the vehicle 10.

IX. Wireless Surface-Mounted Apparatus—FIG. 8

FIG. 8 shows a side cross section of a fifth embodiment of a modular flexible-screen apparatus mounted on a ring of a vehicle steering wheel.

The embodiment can be viewed as a type of hybrid between the embodiments of FIGS. 4 and 7, including an intermediate structure 820, like that 320 of FIG. 4, and being wireless and including steering-wheel surface or embedded connecting structure 730 like the same in FIG. 7.

The embodiment can have any of the features described herein for other embodiments and so is not described further here.

X. Wireless Embedded Modular Apparatus—FIG. 9

FIG. 9 shows a side cross section of a sixth embodiment of a modular flexible-screen apparatus 900 mounted on a ring of a vehicle steering wheel.

The embodiment is like that of FIG. 7, with a primary difference being that the modular flexible-screen apparatus 900 is paired with a distinct intermediary structure 820, like the embodiments of FIGS. 4 and 8.

The embodiment can have any of the features described herein for other embodiments and so is not described further here.

XI. Example Mounting Positions and Sleep Switch—FIG. 10

FIG. 10 shows an example steering wheel 1000 configured according to an embodiment of the present technology, before any modular flexible-screen apparatus is mounted thereon.

In this embodiment, the wheel 1000 include one or more ports 120, 1020, 1022, such as USB ports. More than one modular flexible-screen apparatus can be used at a time, such as one at top 120 and one at the left and/or right 1020, 1022.

In some implementations, users purchase a vehicle 10 or wheel 1000 having a port at the left position 1020 of the wheel 1000 if they are left handed or prefer left-handed control of the modular flexible-screen apparatus, and a vehicle or wheel 1000 having a port at the right position 1022 of the wheel 1000 if they are right handed or prefer right-handed control of the modular flexible-screen apparatus.

The embodiment of FIG. 10 also shows a switch or button 1030. The switch 1030 is in various embodiments a physical switch to turn the screen 202 of the modular flexible-screen apparatus on/off, or between a sleep and awake state or mode. It can be positioned in a variety of locations, including anywhere on the wheel 100, such as on one of the spokes or at a hub as shown. The switch or button 1030 is in a contemplated embodiment provided by a display screen, such as a by one or more icons, radio buttons, the like, or other.

The wheel 1000 and switch or button 1030 can be configured in any of a variety of ways to support or affect option of the arrangement including modular flexible-screen apparatus. As an example, the wheel 100 and switch 1030 can be configured to send a signal to the modular flexible-screen apparatus to engage or disengage the screen 200. In this way, before a user actuates the switch 1030, touches to the modular flexible-screen apparatus in normal driving of the vehicle 10 will not provide input to the modular flexible-screen apparatus.

The signal from the switch 1030 is processed by the apparatus processor using a suitable module, such as the user-interface module, described below in connection with FIG. 15.

XII. Flexible Screens Mounted with Control Interfaces—FIG. 11

FIG. 11 shows a steering wheel 1100 having modular flexible-screen apparatus 100, 1110, 1120 mounted at three optional positions atop the steering wheel rim.

The view also shows example operation or control interfaces, such as but not limited to screens 1140, at three optional positions of a lower portion of the steering wheel 1100.

FIG. 11 shows example graphical user-interface features 1102, related to various types of infotainment for instance. Example user-interface features include a phone or call icon, a music-related icon (music files, music channels, etc.), a navigation-related icon, a user-speech-setting icon, a customer-support-center icon, arrows to change the screen 200 laterally to the left or right, icon by icon or by full screen change.

The one or more control screens 1140 can be configured in any of a wide variety of ways. In various embodiments, the one or more control screens 1140 and the vehicle 10 (e.g., steering wheel 1100) are configured so that a user can by input to the control screen(s) 1140 control the modular flexible-screen apparatus 100, etc. The control screen 1140 can include various control items 1142, for instance, arrows, such as left/right, up/down arrows, and a selection icon, as shown. Responsive actions, from input the control screen(s) 1140, can include moving icons or screens on the screen apparatus 100, 1110, 1120 left/right or up/down, etc.

In various embodiments, the control screen 1140 can be a separate part from the steering wheel 1100, and configured to attach to the steering wheel 1100 in any desired manner, such as by any of the manners described herein for attaching the modular flexible-screen apparatus to the steering wheel. In a contemplated implementation, the control screen 1140 is connected permanently or readily removably to a vehicle component other than the steering wheel, such as a part of a vehicle center console, dashboard, etc.

In various embodiments, any control screen 1140 is movable 1500 in one or more directions, and configured to translate its movement to a control signal sent to the modular flexible-screen apparatus 100 to affect apparatus function. And, again, the screen 1140 need not be a screen in every implementation. It can include a physical knob, button, or other, for instance. As an example, the steering wheel 1100 can be configured (e.g., cavity having tracks along which the screen 1140 moves, and biasing (e.g., spring-loaded) system to return to screen 1140 to original position when the user has completed actuating the screen 1140), and the centrally illustrated control screen 1140 can be configured and arranged at the steering wheel 1100, so that the control screen 1140 can be rotated 1150 to, for instance, control page up/down of the contents shown on the modular flexible-screen apparatus 100. Structure facilitating the screen 1140 movement (e.g., tracks, spring element) is indicated schematically by reference numeral 1152 in FIG. 11.

In various embodiments, the one or more control screens 1140 are permanent to the steering wheel 1100, while the flexible screen apparatus 100 and steering wheel 1100 are configured so that the apparatus 100 can be readily removed from the steering wheel 1100 and can be easily reattached to the steering wheel or the steering wheel of any participating vehicle 10.

In a contemplated embodiment, the operation or control 1140 includes one or more physical switches, knobs, buttons, or the like, to control display of the apparatus 100.

The signal from the interface 1140 is processed by the apparatus processor using a suitable module, such as the user-interface module, described below in connection with FIG. 15.

XIII. Steering-Wheel Compartment Cover—FIG. 12

FIG. 12 shows a steering wheel 1200 having a retractable door or cover 1202, which may be curved, for covering a steering-wheel-ring cavity 720, like that of FIG. 7.

The cover 1202 is configured to be closed, automatically or manually when the cavity 720 is not holding a modular flexible-screen apparatus. In various embodiments the arrangement includes a track 1210 on which the cover 1202 slides in opening or closing.

Any other suitable arrangements for providing a movable cover can be used, such as a hinged door, like that of FIG. 13, or other.

For automatic closing, the arrangement can include a biasing structure 1212 such as a spring, biasing the cover 1202 toward a closed position.

In various implementations, the arrangement is configured so that the modular flexible-screen apparatus, when installed on the wheel 1200, holds the cover 1202 open against force of the biasing structure 1212.

In some embodiments, the cover 1202 is designed so that it looks and/or feels the same or much like the steering wheel would look or feel if there was no cavity 720 or cover 1202.

XIV. Steering-Wheel Port Cover—FIG. 13

FIG. 13 shows a steering wheel 1300 having a movable cover or door 1310 for covering a port 1320, such as a Universal-Serial-Bus (USB) or similar port, when the modular flexible-screen apparatus, including the plug 200, is not mounted to the steering wheel 1300.

The cover 1320 is configured to be closed, automatically or manually when the port 1320 is not holding a plug 200 of the modular flexible-screen apparatus. In various embodiments the arrangement includes a hinge system 1322 about which the door 1320 swings in opening or closing.

Any other suitable arrangements for providing a movable cover can be used, such as a sliding door, like that of FIG. 12, or other.

For automatic closing, the arrangement can include a biasing structure, such as a coil or other spring, which can be incorporated into the hinge system 1322, for instance, biasing the cover 1310 toward a closed position.

In various implementations, the arrangement is configured so that the plug 200 of the modular flexible-screen apparatus, when installed at the wheel 1300, holds the cover 1310 open against force of the biasing structure.

In a contemplated embodiment, the port 1320 includes a shelf or compartment 1324 for receiving the cover 1310 when the cover is in an opened position.

In some embodiments, the cover 1320 is designed so that it looks and/or feels the same or much like the steering wheel would look or feel if there was no port 1320 or cover 1320.

XV. Modular Flexible-Screen Computing Architecture—FIG. 14

FIG. 14 illustrates schematically computing components of an example modular flexible-screen apparatus 100 for mounting on a rim of a steering-wheel 100 of a vehicle 10.

The system includes a primary a hardware-based computing or controller system or, simply, controller system or controller 1400. The controller system 1400 can be referred to by other terms, such as computing apparatus, controller, controller apparatus, or such descriptive term, and can be or include one or more microcontrollers, as referenced above.

The controller system 1400 includes a hardware-based computer-readable storage medium, or data storage device 1402 and a hardware-based processing unit 1404. The processing unit 1404 is connected or connectable to the computer-readable storage device 1402 by way of a communication link 1406, such as a computer bus or wireless components.

The processing unit 1404 can be referenced by other names, such as processor, processing hardware unit, the like, or other.

The processing unit 1404 can include or be multiple processors, which could include distributed processors or parallel processors in a single machine or multiple machines.

The processing unit 1404 can be used in supporting a virtual processing environment.

The processing unit 1400 can include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 1402 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 1402 includes one or more storage modules storing computer-readable code or instructions executable by the processing unit 1404 to perform the functions of the controller system 1400 described herein. Various modules and functions are described throughout the present disclosure including below in connection with FIG. 15.

The data storage device 1402 in some embodiments also includes ancillary or supporting component, such as additional software and/or data supporting performance of the processes of the present disclosure, such as one or more user profiles or a group of default and/or user-set preferences.

As provided, the controller system 1400 also includes a communication sub-system 1410 for communicating with local and external devices and networks 100, 34, 40, 50. The communication sub-system 1410 in various embodiments includes any of a wire-based input/output (i/o), at least one long-range wireless transceiver, and one or more short- and/or medium-range wireless transceivers. The system can be configured to accommodate one or more other types of wired or wireless communications.

The long-range transceiver is in some embodiments configured to facilitate communications between the controller system 1400 and a satellite, a cellular telecommunications network, or other (D2I, D2V, D2X), which can be considered also indicated schematically by reference numeral 40. Example medium-range transmission protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

Remote devices 50 with which the sub-system 1410 communicates are in various embodiments nearby the vehicle 10, remote to the vehicle, near the flexible screen apparatus, remote to the apparatus.

The remote devices 50 can be configured with any suitable structure for performing the operations described herein. Example structure includes any or all structures like those described in connection with the computing device 1400.

the vehicle 10 and the remote devices 50 each include a processing unit, a storage medium comprising modules, a communication bus, and an input/output communication structure. These features are considered shown for the vehicle 10 and the remote device 50 by FIGS. 1 and 14 and the cross-reference here, in this paragraph.

Example remote systems 50 include a remote server (for example, application server), or a remote data, customer-service, and/or control center. An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

XVI. Additional Flexible-Screen Computing Detail—FIG. 15

FIG. 15 emphasizes additional detail of the computing controller 1400 of FIG. 14. The view shows more about the data storage device 1402 and code components or modules thereof. While the description below references select embodiments, such as the modular flexible-screen apparatus 100, the description can apply to any of the embodiments herein.

The computer-executable code 1408 held at the data storage device 1402, as well as code of the vehicle 10, can be configured and arranged in any of a wide variety of ways to perform the functions described herein.

Regarding the computer-executable code 1408, example code components include, for instance:

an apparatus-connection module 1502, which can include
 a wireless-communication module or sub-module;
a user-profile module 1504;
a user-interface module 1506;
a vehicle-control module 1508; and
application modules $1510_1$-$1510_N$, as a few examples.

The view 1500 is considered to show the components and also thereby the algorithm and process performed thereby, although flow indications (arrows, etc.) are not shown between elements.

The apparatus-connection module 1502 is configured to, when executed by the hardware-based processing unit 1404, establish, initiate, or at least facilitate connection between the modular flexible-screen apparatus 100. The connection can include one or more introduction steps, whereby the modular flexible-screen apparatus 100 and the vehicle 10 each introduces itself to the other.

The connection in various combinations establishes one or more communication channels by which the modular flexible-screen apparatus 100 and vehicle 10 will communicate.

In various embodiments, the connecting includes a handshake operation between the modular flexible-screen apparatus 100 and the vehicle 10. The process establishes a channel by which data and communications such as messages or instructions, can be shared between the modular flexible-screen apparatus 100 and the host vehicle 10.

In embodiments, during this handshake process, protocol information can be exchanged or shared, such as USB mass storage device protocol information.

For embodiments in which both the devices include a dynamic programming language, such as JavaScript, Java or a C/C++ programming language, the operation can include a handshake routine between the modular flexible-screen apparatus 100 and the host vehicle 10 using the dynamic programming language.

The user-profile module 1504 comprises at least one profile established for each user of the modular flexible-screen apparatus 100. In a contemplated embodiment, the user-profile module 1504 of each the modular flexible-screen apparatus 100 can hold a profile for each of more than one user of the modular flexible-screen apparatus 100.

Each user profile includes pre-established preferences or settings. These are referred to primarily herein as preferences, although they could be considered or referred to as settings, or other descriptive terminology, as well.

Any preference can in some implementations be established at a default setting, which may be established in manufacturing or original programming of the modular flexible-screen apparatus 100 before the user receives the modular flexible-screen apparatus 100. The modular flexible-screen apparatus 100 is also configured in some embodiments to allow a user or other person or system maintaining the modular flexible-screen apparatus 100 to return any setting or preference to a default setting.

In various embodiments, the apparatus 10 is configured to change the preferences based on input by any of a variety of inputs sources.

The profile for each user can include user-specific preferences communicated to the system by the user, such as via an apparatus 100 or vehicle 10 touch-screen or microphone interface, a laptop or smartphone that communicates the preferences to the apparatus 100, the like or other. In contemplated embodiments, a user or other person can change preferences via phone, tablet, laptop or other computer, which can communicate the preferences via wire or wirelessly to the apparatus 10.

Preferences include any settings affecting a manner by which the apparatus 100 or vehicle 10 interacts with the user or interacts (shares data) with each other or any non-vehicle system such as a server 50 or user device 34. Example preferences include volume, tone, or other sound preferences for media delivery, type or volume of notifications provided to the user, as just a few examples.

Other example preferences include volume, tone, or other sound preferences for media delivery, type or volume of notifications provided to the user, as just a few examples.

In some embodiments, user preferences can include, for instance, user preferences for when and how messages are provided—for instance, HUD vs. center-stack screen vs. flexible-screen apparatus 100, and with or without audio, and if audio, a preferred type of audio.

As still a few other examples, subjects for preferences can include:
- radio channel preferences;
- radio volume preferences;
- seat position preferences (lumbar, seat height, fore/aft, etc.);
- heating, ventilating, and air-conditioning (HVAC) preferences;
- mirror positions;
- window or sun-roof positions;
- pedal position;
- the like, and others.

In various embodiments, one or more preferences include any settings affecting a manner by which the system interacts with the user or interacts (shares data) with the vehicle or any non-vehicle system, such as a server 50 or user device 34.

Preference data can also include, or be generated based on, historic data representing past activity between the system and a user, between the system and other users, or other systems and these or other users, for instance. If on repeated occasions, in response to receiving a certain notification, a user turns down a volume, the apparatus 100 can generate historic data, or otherwise update the preferences, for that user requiring the system to use a lower-volume for the notification.

Preferences can also be received from a remote profile, such as a profile stored at the flexible screen 100, other user device 34, or a remote server 50, and local and remote profile features can be synchronized or shared between the apparatus 100, the vehicle 10, a local or user mobile device 34, and/or any remote network or system 40, 50.

The user-interface module 1506, when executed by the hardware-based processing unit 1404, controls the display screen of the modular flexible-screen apparatus 100 or any other user-apparatus interface components for communicating to the user and receiving input from the user. The module 1506 controls which icons are displayed, for instance, what notifications are delivered to the user, such as alerts about driving conditions, the like, or other, and when.

Alert conditions are determined at this module 1504 in some embodiments, or at the vehicle 10. Example alert conditions include driving conditions, such as a need to slow down, blind-spot vehicle presence, lane departure, collision potential, nearby pedestrian(s), turn right per navigation routing, etc. Such signaling can include words, or lighting, such as lights that are position, brightness, or color coded, as just a few examples. A light that is hot red toward a right side of the screen 202 of the apparatus 100 can indicate that a danger is at a right side of the vehicle, and further the red lighting being toward the top or bottom can indicate if the danger is toward the front or rear of the right side, respectively. Or yellow can indicate a potential but not very serious or immanent risk.

A displayed alert can be accompanied by other types of alerting, via the flexible-screen apparatus 100 or vehicle 10, such as haptic feedback from the apparatus 100, steering wheel 110, vehicle seat, or other vehicle HMI, audio from the apparatus 100 or vehicle 10, visual at the vehicle display 37, and/or other.

The user-interface module 1506, when executed by the hardware-based processing unit 1404, receives user input to the modular flexible-screen apparatus 100 and acts accordingly. The user input is received by user touch to the screen of the apparatus 100, for instance. In a contemplated embodiment, the apparatus 100 is configured to receive other types of user input, such as audio input via a microphone (not n in detail) of the apparatus.

In various embodiments, the apparatus 100 is configured to receive and process user handwriting input to the screen 202. Handwriting input can indicate characters or words that the apparatus 100 would translate to user communication, such as indicating a desired destination, a user preference, or an application selection, or to authenticate to the apparatus 100 and/or the vehicle 10.

The modular flexible-screen apparatus 100 can be configured to receive any of various types of user touch, such as simple selection touches, longer selection touches, and swipe or other touch or non-touch gestures.

Regarding non-touch gestures, the apparatus 100 is configured in some embodiments to sense non-touch user gestures, such as a wave of the hand—left/to right (for move page left or right) distinguished by the apparatus 100 from up/down (for move page up or down) by the apparatus 100. For sensing non-touch gestures, the apparatus 100 include any suitable sensing hardware, or hardware and software, such as a camera and gesture-recognition algorithm.

The vehicle-control module 1508, when executed by the processing unit 1404, affects operation of one or more vehicle operations. Determining which vehicle operations to affect and how may be based on the user input, received via the user-profile module 1504 and/or the user-interface module 1506.

The vehicle-control module 1508 can perform in response to any of a variety of triggers.

As one example, the vehicle-control module 1508 can be configured to, when the modular flexible-screen apparatus 100 is installed on the vehicle 10 and vehicle 10 power turned on, the module 1508, executed by the processing unit 1404, sends one or more instructions to the vehicle 10 to start functions. The instruction can include preferred HVAC settings, for instance, such as temperature and fan settings indicated in the user-profile module 1504.

As another example, a user may select from a display at the screen of the modular flexible-screen apparatus 100 a radio icon, such as a radio icon of the icons 1102 shown in FIG. 11. In response to receiving corresponding input data from the user-interface module 1506, the processing unit 1404, executing the vehicle-control module 1508 could, for instance turn on a vehicle radio and start playing a favorite radio channel at a preferred volume level and speaker output balance, as indicated by preference data of the user-profile module 1504.

As another example, a user may select from the display at the screen of the modular flexible-screen apparatus 100 a navigation icon, such as that of the icons 1102 shown in FIG. 11. In response to receiving corresponding input data from the user-interface module 1506, the processing unit 1404, executing the vehicle-control module 1508 could, for instance, send a signal to the vehicle to open a navigation application at the vehicle, if not already open, and initiate at least a first navigation operation. A first navigation operation can include, for instance, presenting from the vehicle, via the flexible screen apparatus 100 or vehicle screen 37, a recommendation for routing, such as "Would you like to be routed home."

Determinations, by the vehicle-control module 1508, of which vehicle apps to control, can as mentioned be based on preference data of the user-preference module 1504. In the navigation example of the preceding paragraph, the user-preference module 1504 can include user settings such as their home and work addresses, or these addresses can be stored at the vehicle 10. The vehicle-control module 1508 can, then, obtain the home address information and cause the vehicle 10 to propose routing to the home address. The determination can also be based on other context information, such as time of day. The vehicle-control module 1508 may determine that the user is likely headed home based on time of day, present geographic location, and/or historic behavior information, such as when the user tended to drive where.

Other example vehicle controls, initiated via the vehicle-control module 1508, including and are not limited to:
- initiating or controlling a phone application of the vehicle, to make calls, etc.;
- initiating or controlling interactions between the vehicle or user and a remote customer service center, such as the OnStar center; and
- any infotainment functions of the vehicle 10.

The modular flexible-screen apparatus 100 in various embodiments also includes one or more application modules $1510_1$-$1510_N$. Each module may correspond to an application. Each application can correspond to an application on the vehicle 10. For instance, a first application of one of a first application module $1510_1$ can be configured to generate a first-apparatus application instruction tailored in a manner that can be processed and understood by a matching first-vehicle application.

In some embodiments, one or more of the applications of the application modules $1510_1$-$1510_N$ can project output to the user or vehicle 10. In this way, the application is projected to the vehicle 10, instead of the apparatus 100 controlling an application of the vehicle 10. The output can be provided to the user via a vehicle 10 HMI, such as a speaker and/or screen 37, and in some implementations via the screen of the apparatus 100, whether first processed at the vehicle 10.

XVII. Wearable Functionality—FIG. 16

FIG. 16 shows an example embodiment in which the modular flexible-screen apparatus 100 is worn—i.e., is an electronic wearable—on a user wrist until the apparatus 100 is installed on a vehicle 10 for use at a participating vehicle 10.

In various embodiments, the modular flexible-screen apparatus 100 is configured to be used by the user while the apparatus 100 is disconnected (physically or by wire) from the vehicle 10. In implementations, the user-interface module 1506 interfaces between the user and apparatus 100 application modules $1510_1$-$1510_N$ to provide output from the apparatus 10 to the user. Example output includes that from applications for music, radio, navigation while walking or riding as a passenger in a non-e vehicle, communications, such as texting or calls, or gaming, as a few examples.

Visual output from the apparatus 100 in these cases can be provided via the apparatus 100 flexible screen, and audio output via an external speaker, such as headphones, earbuds, or another speaker, or an apparatus 100 speaker. Connections between the apparatus 100 and external speakers are wireless or by wire. An apparatus 100 speaker is not shown in detail.

XVII. Additional Structure, Algorithm Features, and Operations

In combination with any of the other embodiments described herein, or instead of any embodiments, the present technology can include any structure or perform any functions as follows:

The technology in various embodiments includes:
i. A system including a curved or bendable touchscreen configured to wrap at least partially around steering wheels.
ii. The touchscreen allows user to control vehicle functions.

iii. The touchscreen functions as a display, allowing quick glances, being positioned close to a view of the road for the driver.

iv. The apparatus 100 can integrate other existing controls, e.g., buttons on the steering wheel, touchpad, etc. In such case, a user can have a more integrated experience, using vehicle HMI that they may already be familiar with.

v. The apparatus allows both control and display of output or control options for applications, such as phone, audio, or NAV.

vi. The apparatus can store or access (from vehicle or remote server 50, for instance) user preferences affecting how vehicle or apparatus functions are performed, such as vehicle channels, volume preference, HVAC preference, etc.

vii. Controls of the apparatus 100 include a user being able to move a display of the apparatus by touch, touch gestures, etc., such as to slide or move aside or up/down display of the apparatus 100.

viii. In various embodiments, apparatus 100 display control is controlled by a separate operation screen 1140.

ix. Separate on/off, or sleep/awake, switch 1030, or at the control or operation screen, knob, etc., 1140 may be provided to avoid unintended operation of the apparatus 100, and in some implementations of unwanted display, especially during driving.

XVIII. Select Advantages

Many of the benefits and advantages of the present technology are described above. The present section restates some of those and references some others. The benefits described are not exhaustive of the benefits of the present technology.

System including curved or bendable touchscreen display, being configured to wrap at least partially around a convenient portion of steering wheels, being closer to driver's hand than vehicle HMI (screen 37, etc.), provide a convenient, easy, and more-natural i/o user interface, for selections, touch gestures, handwriting input, the like or other.

In some embodiments, selections can be made without a user moving their arm, or only moving their hand and arm slightly, and in some cases without moving their hands from the steering wheel during driving.

And the arrangement, in various embodiments, can be configured so that a right-handed or left-handed user can initiate controls via close touch to a right- or left-sided apparatus, respectively.

By being configured to mount at convenient steering wheel positions, such as atop a rim of the wheel, the apparatus is also very easy to see by a driver without the driver needing to move her eyes far from view of the road.

XIX. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A modular flexible-screen apparatus, for controlling functions of a host vehicle based on a stored user profile, comprising:
    a flexible display screen configured to conform to a shape of a driver-area component of the host vehicle;
    a hardware-based processing unit connected communicatively with the flexible display screen; and
    a non-transitory computer-readable storage component comprising:
        a user-profile module comprising the user profile, the user profile including preferences related to functions of the host vehicle;
        a user-interface module that, when executed by the hardware-based processing unit, provides user output to, and receives user input from, a user of the modular flexible-screen apparatus; and
        a vehicle-control module that, when executed by the hardware-based processing unit:
            determines a host-vehicle-control instruction based on the user input and at least one preference of the user profile; and
            sends the host-vehicle-control instruction to the host vehicle for corresponding implementation at the host vehicle.

2. The modular flexible-screen apparatus of claim 1 wherein:
    the apparatus is for controlling functions of multiple host vehicles based on the stored user profile;
    the flexible display screen is configured to conform to shapes of driver-area components of each host vehicle; and
    the non-transitory computer-readable storage component comprises an apparatus-connection module that, when connected to the driver-area component of any subject host vehicle, established a communication channel with the subject host vehicle for providing the host-vehicle-control instruction to the subject host vehicle.

3. The modular flexible-screen apparatus of claim 1 wherein the driver-area component is selected from a group consisting of:
- a steering wheel of the host vehicle;
- a gear shift of the host vehicle;
- an instrument-cluster hood or cover of the host vehicle; and
- a dashboard component of the host vehicle.

4. The modular flexible-screen apparatus of claim 1 further comprising a plug being:
- connected communicatively with the hardware-based processing unit; and
- sized, shaped, and positioned at the apparatus to, for use of the apparatus on the host vehicle, connect directly to a matching port of the driver-area component of the host vehicle, without intervening components between the plug and the port.

5. The modular flexible-screen apparatus of claim 1 further comprising a body comprising the flexible screen, wherein the body is sized and shaped to, when bent, fit snugly within an apparatus compartment in the driver-area component of the host vehicle.

6. The modular flexible-screen apparatus of claim 1 further comprising a mounting material or structure configured and positioned at the apparatus to promote temporary attachment of the apparatus to the driver-area component of the host vehicle.

7. The modular flexible-screen apparatus of claim 1 wherein the user-interface module, when executed by the hardware-based processing unit, receives an enablement signal from a host-vehicle switch and changes the apparatus between an on mode and an off mode, or between a sleep mode and an awake mode based on the enablement signal.

8. The modular flexible-screen apparatus of claim 1 wherein the user-interface module, when executed by the hardware-based processing unit, receives a control signal from a host-vehicle apparatus-operation interface and changes visual output of the apparatus based on the control signal.

9. The modular flexible-screen apparatus of claim 1 further comprising a body comprising the flexible screen, wherein the body is sized and shaped to attach to a user wrist for transporting the apparatus when the apparatus is not in use on the host vehicle.

10. A method, for controlling functions of a host vehicle using a modular flexible-screen apparatus based on a user profile stored at the apparatus, the method comprising:
- bending, by a flexible display screen of the apparatus, to conform to a shape of a driver-area component of the host vehicle;
- connecting, by the apparatus, after the bending, physically to the driver-area component;
- receiving, by a hardware-based processing unit of the apparatus executing a user-interface module of the apparatus, user input by way of the flexible display screen;
- determining, by the processing unit executing a host-vehicle control module of the apparatus, a host-vehicle-control instruction based on the user input and at least one preference of the user profile; and
- sending, by the apparatus, the host-vehicle-control instruction to the host vehicle for corresponding implementation at the host vehicle.

11. The method of claim 10 wherein:
the host vehicle, the driver-area component, and the host-vehicle-control instruction are a first host vehicle, a first driver-area component, and a first host-vehicle-control instruction;
the method further comprises:
- bending, by the flexible display screen, to conform to a shape of a second driver-area component of a second host vehicle;
- receiving, by the hardware-based processing unit of the apparatus executing the user-interface module of the apparatus, after the apparatus has been attached to the second vehicle, second user input by way of the flexible display screen;
- determining, by the processing unit executing the host-vehicle control module of the apparatus, a second host-vehicle-control instruction based on the second user input and at least one preference of the user profile; and
- sending, by the apparatus, the second host-vehicle-control instruction to the second host vehicle for corresponding implementation at the second host vehicle.

12. The method of claim 10 wherein:
the bending, the connecting, the communication channel, the receiving, the determining, the user input, the host-vehicle-control instruction, and the sending are a first bending, a first connecting, a first communication channel, a first receiving, a first determining, a first user input, a first host-vehicle-control instruction, and a first sending;
the method further comprises:
- establishing, by an apparatus-connection module of the apparatus, after the first bending, and before the first receiving, the first determining, and the first sending, a communication channel with the host vehicle for providing the host-vehicle-control instruction to the host vehicle;
- closing, by the apparatus-connection module, after the establishing, the first receiving, the first determining, and the first sending, the communication channel established with the host vehicle;
- disconnecting, by the apparatus, physically from the driver-area component of the host vehicle;
- bending, in a second bending, by the flexible display screen of the apparatus, to conform to the shape of the driver-area component of the host vehicle;
- establishing by the apparatus-connection module of the apparatus, after the second bending, a second communication channel with the host vehicle for providing a second host-vehicle-control instruction to the host vehicle;
- receiving, by the hardware-based processing unit executing the user-interface module of the apparatus, a second user input by way of the flexible display screen;
- determining, by the processing unit executing the host-vehicle control module of the apparatus, the second host-vehicle-control instruction based on the second user input and at least one preference of the user profile; and
- sending, by the apparatus, the second host-vehicle-control instruction to the host vehicle for corresponding implementation at the host vehicle.

13. The method of claim 10 wherein the driver-area component is selected from a group consisting of:
a steering wheel of the host vehicle;
a gear shift of the host vehicle;
an instrument-cluster hood or cover of the host vehicle; or
a dashboard component of the host vehicle.

14. The method of claim 10 further comprising connecting, by the apparatus, communicatively with the host vehicle by way of a plug of the apparatus connecting directly to a matching port of the driver-area component of the host vehicle, without intervening components between the plug and the port.

15. The method of claim 10 wherein:
the apparatus further comprises a body comprising the flexible screen, wherein the body is sized and shaped to, when bent, fit snugly within an apparatus compartment in the driver-area component of the host vehicle; and
connecting the apparatus physically to the driver-area component comprises fitting the body snugly within the apparatus compartment.

16. The method of claim 10 further comprising receiving, by the hardware-based processing unit executing the user-interface module, one or both of:
an enablement signal from a host-vehicle switch and changing the apparatus between an on mode and an off mode, or between a sleep mode and an awake mode based on the enablement signal; and
a control signal from a host-vehicle apparatus-operation interface and changing visual output of the apparatus based on the control signal.

17. The method of claim 10 wherein:
the apparatus comprises a body comprising the flexible screen, wherein the body is sized and shaped to attach to a user wrist for transporting the apparatus when the apparatus not in use on the host vehicle; and
the method further comprises bending, by the body, to attach to the user wrist for transporting the apparatus when not in use on the host vehicle.

18. A non-transitory computer readable storage device, for use at a modular flexible-screen apparatus to control functions of a host vehicle based on a user profile, comprising:
a user profile comprising one or more preferences related to host-vehicle operation;
a user-interface module that, when executed by a hardware-based processing unit, after the apparatus is bent to conform to a shape of a driver-area component of the host vehicle and connected physically to the driver-area component, receives user input by way of a flexible display screen of the apparatus; and
a host-vehicle control module that, when executed by the hardware-based processing unit:
determines a host-vehicle-control instruction based on the user input and at least one of the preferences of the user profile; and
initiates sending of the host-vehicle-control instruction to the host vehicle for corresponding implementation at the host vehicle.

19. The non-transitory computer readable storage device of claim 18 wherein:
the bending, the connecting, the receiving, the determining, the user input, the communication channel, the host-vehicle-control instruction, and the sending are a first bending, a first connecting, a first receiving, a first determining, a first user input, a first communication channel, a first host-vehicle-control instruction, and a first sending;
the non-transitory computer readable storage device further comprises an apparatus-connection module that, when executed by the hardware-based processing unit:
establishes, after the first bending, and before the first receiving, the first determining, and the first sending, a communication channel with the host vehicle for providing the first host-vehicle-control instruction to the host vehicle;
closes, after the establishing, the first receiving, the first determining, and the first sending, the first communication channel established with the host vehicle; and
establishes, after the closing, after the apparatus is disconnected physically form the driver-area component of the vehicle, and after the apparatus is reconnected to the driver-area component, a second communication channel;
the user-input module, when executed by the processing unit, receives, by way of the flexible screen, a second user input; and
the host-vehicle control module, when executed by the processing unit:
determines a second host-vehicle-control instruction based on the second user input and at least one preference of the user profile; and
sends the second host-vehicle-control instruction to the host vehicle for corresponding implementation at the host vehicle.

20. The non-transitory computer readable storage device of claim 18 wherein:
the host vehicle, the driver-area component, and the host-vehicle-control instruction are a first host vehicle, a first driver-area component, and a first host-vehicle-control instruction;
the non-transitory computer readable storage device further comprises an apparatus-connection module that, when executed by the hardware-based processing unit:
establishes, after the first bending, and before the first receiving, the first determining, and the first sending, a communication channel with the host vehicle for providing the first host-vehicle-control instruction to the host vehicle;
closes, after the establishing, the first receiving, the first determining, and the first sending, the first communication channel established with the host vehicle; and
establishes, after the closing, after the apparatus is disconnected physically form the driver-area component of the vehicle, and after the apparatus is reconnected to a second driver-area component of a second host vehicle, a second communication channel with the second host vehicle;
the user-input module, when executed by the processing unit, receives, by way of the flexible screen, a second user input after the second communication channel is established between the apparatus and the second host vehicle; and
the host-vehicle control module, when executed by the processing unit:
determines a second host-vehicle-control instruction based on the second user input and at least one preference of the user profile; and
sends the second host-vehicle-control instruction to the second host vehicle for corresponding implementation at the second host vehicle.

* * * * *